(12) United States Patent
Siegel et al.

(10) Patent No.: US 12,734,670 B2
(45) Date of Patent: Sep. 15, 2026

(54) CASE FOR STORING AND SUPPORTING A POWER TOOL IN USE

(71) Applicant: Robert Bosch GmbH, Stuttgart (DE)

(72) Inventors: Eric Siegel, Arlington Heights, IL (US); Christopher Heflin, Oak Park, IL (US); Sean Zhang, Palatine, IL (US); Bradley Padget, Huntley, IL (US)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 18/817,790

(22) Filed: Aug. 28, 2024

(65) Prior Publication Data

US 2026/0061588 A1 Mar. 5, 2026

(51) Int. Cl.

| | |
|---|---|
| ***B23D 57/00*** | (2006.01) |
| ***B23D 45/02*** | (2006.01) |
| ***B23D 47/02*** | (2006.01) |
| ***B23D 59/00*** | (2006.01) |
| ***B23Q 9/00*** | (2006.01) |
| ***B25H 1/00*** | (2006.01) |
| ***B25H 1/04*** | (2006.01) |
| ***B25H 3/00*** | (2006.01) |
| ***B25H 3/02*** | (2006.01) |
| *B23D 45/16* | (2006.01) |

(52) U.S. Cl.

CPC ................. *B25H 3/02* (2013.01); *B25H 1/04* (2013.01); *B25H 3/006* (2013.01); *B23D 45/16* (2013.01)

(58) Field of Classification Search

CPC .... B23D 45/16; B23D 47/025; B23Q 9/0014; B23Q 9/005; B25F 5/021; B25F 5/02; B25F 5/029; B25H 1/04; B25H 1/0078; B25H 1/08; B25H 1/12; B25H 3/02; B25H 3/006; B25H 3/021; B25H 3/023; B27B 9/04; B27B 11/02; B65D 2251/1083; Y10S 312/902; Y10T 83/68

USPC .......... 144/285, 286.1, 286.5, 287; 206/223; 269/901

See application file for complete search history.

(56) References Cited

U.S. PATENT DOCUMENTS

| | | | | |
|---|---|---|---|---|
| 416,425 A * | 12/1889 | Schmitt | B65D 11/00 220/520 |
| 513,726 A * | 1/1894 | Potts | B65D 25/04 190/106 |
| 1,699,765 A * | 1/1929 | Staples | B65D 25/02 220/826 |

(Continued)

FOREIGN PATENT DOCUMENTS

| | | | |
|---|---|---|---|
| CA | 3137334 A1 * | 5/2022 | B23B 47/26 |
| CN | 113492388 | 10/2021 | |

(Continued)

*Primary Examiner* — Gideon R Weinerth

(74) *Attorney, Agent, or Firm* — Kelly McGlashen; Maginot, Moore & Beck LLP

(57) ABSTRACT

A storage case is configured to store a power tool and ancillary devices. The storage case includes a first case half pivotably joined to a second case half. In addition, the storage case includes a worktable configured to be stowed inside the storage case. The worktable is formed of a first foldable panel that is rotatably joined to the first case half and a second foldable panel that is rotatably joined to the second case half. When the storage case is in an open case configuration, the first and second panels lie flat and cooperate to form a worktable that includes a power tool guide device.

21 Claims, 19 Drawing Sheets

(56) References Cited

U.S. PATENT DOCUMENTS 1,849,565 A * 3/1932 Brady .................... A45C 13/02 190/110
2,020,216 A * 11/1935 Sarac ................ B23D 57/0092 144/285
2,677,399 A * 5/1954 Getsinger ............ B23Q 9/0014 83/468.3
2,693,258 A * 11/1954 Fleisch .................... A47B 3/10 190/11
2,695,210 A * 11/1954 Evans .................... B25H 3/023 190/30
2,697,460 A * 12/1954 Barnett .................. B25H 3/023 206/349
2,759,507 A * 8/1956 Davis ........................ B27C 9/02 108/15
2,786,500 A * 3/1957 Unterfranz ............... B25H 1/04 144/285
2,803,275 A * 8/1957 Ruben ....................... B27B 5/26 144/285
2,990,859 A * 7/1961 Ruben ................ B23D 57/0092 83/477
3,018,355 A * 1/1962 Wallerstein ............... B26F 3/12 83/522.18
3,713,529 A * 1/1973 Meksula ................ A01K 97/06 312/294
3,933,243 A * 1/1976 Schurman .............. B65D 85/68 206/349
4,077,292 A * 3/1978 Cole .................... B23Q 9/0014 30/372
4,252,239 A * 2/1981 Snyder .............. B23D 57/0092 206/349
4,378,716 A * 4/1983 Volk ..................... B23Q 9/0078 83/438
4,391,386 A * 7/1983 Moret .................. B65D 21/064 220/819
4,934,549 A * 6/1990 Allen ..................... A45C 11/20 220/520
5,090,283 A 2/1992 Noble
5,330,069 A * 7/1994 Jamison ............... B65D 43/161 220/826
5,862,842 A * 1/1999 You .......................... B25H 1/08 144/286.5
5,901,763 A * 5/1999 You .......................... B25H 1/08 144/286.5
6,167,680 B1 * 1/2001 Horn ...................... B65D 25/04 220/4.23
7,290,655 B1 * 11/2007 Wood ..................... B23D 51/02 206/349
7,472,730 B2 * 1/2009 Adkins ................... B25B 5/068 144/287
9,616,563 B2 * 4/2017 Vilkormirski .......... B25H 3/023
9,776,262 B2 * 10/2017 Wiker ..................... B27B 5/222
11,858,114 B2 1/2024 Wilcox et al.
11,883,891 B2 * 1/2024 Hall .......................... B27B 9/04
2006/0201834 A1 9/2006 Lutz
2008/0083106 A1 * 4/2008 Elsworthy ............ B23D 47/025 144/285
2009/0223971 A1 * 9/2009 Moffett .................. B25H 3/023 220/500
2020/0047265 A1 * 2/2020 Ender ...................... B25H 3/02
2021/0177134 A1 * 6/2021 Adams ................... B65D 21/02
2024/0326230 A1 * 10/2024 Reinhart .................. B25H 1/04
2025/0135678 A1 * 5/2025 Andersen ............. B23D 59/001
2025/0242476 A1 * 7/2025 Speer ....................... B25H 1/18
2026/0061589 A1 * 3/2026 Siegel ...................... B25H 3/02

FOREIGN PATENT DOCUMENTS

CN 217292278 8/2022
CN 115870940 3/2023
CN 108453685 10/2023
CN 119141497 A * 12/2024 ........... B23D 47/025
DE 102014220232 4/2016
DE 102015222123 5/2017
JP 2019030951 2/2019
JP 6953883 10/2021

* cited by examiner

CASE FOR STORING AND SUPPORTING A POWER TOOL IN USE

BACKGROUND

Hand-held power tools may be used at multiple locations within a single site and/or at multiple sites. Storage cases can be used to store and transport a hand-held power tool and ancillary devices such as accessories and attachments used to facilitate operation of the power tool. Such storage cases may facilitate organization and storage of the power tool and the ancillary devices, as well as carrying the power tool and ancillary devices between sites or locations. A storage case may also provide protection to case contents from damage through impact. Further, as some power tools can contain one or more sharp or hazardous surfaces, storage cases can protect articles with which the power tool may come in contact with from injury or damage.

However, although the power tool is portable between locations, not all locations provide adequate working conditions. For example, some locations may lack a work surface. Accordingly, improved storage cases for power tools are desirable. In particular, a storage case for a power tool which provides storage solutions for the power tool, accessories and attachments, and also provides a portable work surface would be advantageous.

SUMMARY

A compact storage case and system or kit for storing and operating a hand-held power tool is described. As used herein, a "hand-held power tool" refers to an electric hand-held power tool, for example a drill, a grinder, a sander, a saw, etc. In the illustrated embodiment, the power tool is a circular saw. The hand-held power tool may be used to machine a workpiece. Along with the power tool, accessories and attachments, the storage case is configured to stow a folded worktable for purposes of storage and transportation. When the storage case is opened, the worktable may be unfolded to provide a flat, outward-facing work surface that is supported on the opened storage case.

The work surface includes a guide device that is configured to support the workpiece and/or to support and/or guide a movement of the hand-held power tool by the user during operation, in particular relative to the workpiece. The guide device includes a pair of rails that are fixed to the work surface. The pair of rails are parallel to each other and to a folding axis of the storage case. The pair of rails are spaced apart from the work surface to overlie the work surface when the storage case in an open configuration. At least one rail of the pair of rails is configured to engage with a portion of the power tool in such a way that the power tool is restricted to movement in a direction parallel to the rails.

Power tools may require accessories such as blades for use of the power tool. While only a single blade is used at a time, it may be advantageous to have additional blades on hand to account for blade wear or for application to different materials. In addition, many power tools such as chainsaws require lubricating oil and adjustment tools. Further, power tools may be powered by removable batteries that require charging by a battery charger unit. Still further, there are a number of accessories and/or attachments that may be used to facilitate use of the power tool such as a work piece pusher, clamps and other workpiece guiding and support devices. The storage case may be configured to provide storage for at least some of the ancillary devices.

The storage case described herein protects the power tool and ancillary devices from externally applied stress, such as impacts, as well as from dust, moisture and/or other unfavorable environmental influences. Alternatively, it is conceivable that the storage case is only provided for the ancillary devices and is designed separately from a separate storage device for the hand-held power tool.

The storage case is designed to be portable and includes two case halves joined by a hinge so as to have a clam shell form factor. The storage case may include a handle that pivots relative to the storage case and may be gripped by the user during transport of the storage case. The storage case may include latches or other detachable fasteners such as buckles, snaps or clips that maintain the storage case in a closed configuration and permit the storage case to be selectively opened.

In some aspects, the power tool storage case has multiple configurations. For example, the storage case has a first configuration in which the storage case is closed and is used to enclose and store a hand-held power tool and ancillary devices including a charger, at least one battery, power tool guide rails, a miter guide, and/or other items used to facilitate operation of the power tool. The first or closed configuration may be maintained by latching the case halves together and corresponds to the transport configuration. The power tool storage case has a second configuration in which the case is open to an extent that the case halves are arranged side-by-side so that each case half opens upward. In this configuration, the panels that form a worktable are folded and the power tool and the accessories are removably stowed within halves of the case. In addition, the power tool storage case has a third configuration in which the case is open in a manner identical to the second configuration. However, in the third configuration, the panels that form the worktable are unfolded to lie in a single plane to provide a cutting surface and the power tool and optionally also selected accessories have been removed from the case halves.

To achieve these configurations, the panels that form the worktable are rotatably attached (for example via hinges or pivot joints) to each case half and are also configured to fold at a location separate from the attachment location. When in the second configuration, the panels may be folded relative to each case half to expose the devices and accessories stored in the case. The folded panels also permit storage of a power tool that has a height dimension that is greater than a height dimension of the case halves. When in the third configuration, the panels are unfolded relative to each case half and arranged so that the panels are coplanar and adjoin each other. In the unfolded configuration, the panels provide a flat worktable, an outer surface of which is the work surface.

Some of the accessories stored in the case may be mounted to the work surface. An example of an accessory is the guide device including the pair of rails that are fixed to the work surface of one of the panels. When the storage case is in the third configuration and the power tool is use, the rails hold the power tool relative to the work surface and guide the power tool as the power tool is used to cut a workpiece supported on the work surface. After use, the storage case may be transformed to the second configuration in which the rails are automatically stowed when the panels are folded. The power tool, accessories, batteries, etcetera, may be re-stowed inside the case, and the storage case closed (e.g., returned to the first configuration) for storage and/or transport of the power tool and accessories.

In some aspects, a storage case includes a first case half pivotably joined to a second case half via a case rotational joint. In addition, the storage case includes a worktable configured to be stowed inside the storage case. The worktable includes a panel that is supported on the first case half. The panel has a folding rotational joint that permits the panel to fold so that a first part of the panel overlies a second part of the panel.

In some embodiments, the panel is rotatably joined to the first case half via a panel rotational joint.

In some embodiments, the first case half and the second case half each include a base, and a sidewall that surrounds a periphery of the base and is perpendicular to the base. The sidewall includes a fixed end that is integral with the periphery of the base and a free end opposite the fixed end. The second case half is rotatably connected to the first case half along a first portion of the free end via the case rotatable joint. In addition, the first case half and the second case half each include the panel. The panel has a first edge that is rotatably connected to a second portion of the free end via the panel rotatable joint, and a second edge that is parallel to the first edge. The panel also includes the first part that includes the first edge, the second part that includes the second edge and the folding rotatable joint that joins the first part to the second part. The panel is foldable about the folding rotatable joint between a first panel configuration in which the first part and the second part are coplanar and disposed side-by-side and a second panel configuration in which the first part and the second part are stacked along an axis that is perpendicular to an axis of rotation of the folding rotatable joint. The storage case may be arranged in a closed case configuration or an open case configuration. In the closed case configuration, the free end of the first case half faces the free end of the second case half and the panel of the first case half and the panel of the second case half are disposed inside the storage case. In the open case configuration, the first case half is disposed side-by-side with the second case half, and the panel of the first case half and the panel of the second case half are each in the first panel configuration and cooperate to provide a work surface.

In some embodiments, the folding rotatable joint is parallel to the first edge and the second edge.

In some embodiments, at least one of the case rotatable joint, the panel rotatable joint and the folding rotatable joint is a hinge.

In some embodiments, the worktable has an integrated rail device that is supported on the work surface and is configured to slidably support a power tool relative to the work surface.

In some embodiments, when the storage case is arranged in the open case configuration, the work surface is supported on both the first case half and the second case half.

In some embodiments, the panel of the first case half and the panel of the second case half each include an inner surface and an outer surface that is opposite the inner surface, the storage case includes a rail device that is mounted on the outer surface of the panel of the first case half, and the rail device is configured to support a power tool relative to the work surface.

In some embodiments, the rail device is fixedly mounted on the outer surface of the panel of the first case half at a location in which when the panel is in the second panel configuration, the rail device resides in the first case half between the panel and the base.

In some embodiments, the rail device is fixedly mounted on the outer surface of the panel of the first case half, and includes a rail that is spaced apart from the outer surface of the panel of the first case half and extends in a direction parallel to a rotational axis of the case rotatable joint.

In some embodiments, the panel of the first case half and the panel of the second case half each include an inner surface and an outer surface that is opposite the inner surface. The storage case includes a pair of rails that is mounted on the outer surface of the panel of the first case half and the pair of rails is configured to support a power tool relative to the work surface.

In some embodiments, at least one rail of the pair of rails is configured to form an interlocking engagement with a portion of the power tool.

In some embodiments, at least one rail of the pair of rails is configured to engage with a portion of the power tool in such a way that the power tool is restricted to movement in a direction parallel to a rotational axis of the first case rotational joint.

In some embodiments, the work surface comprises a channel that extends in parallel to the pair of rails, and the channel is disposed between the respective rails of the pair of rails as seen when the work surface is viewed in top plan view.

In some embodiments, the storage case further comprises a miter guide that is adjustably connected to the work surface at a location that is between the respective rails of the pair of rails as seen when the work surface is viewed in top plan view.

In some embodiments, the work surface includes grooves that extend in parallel to a portion of the free edge, the grooves configured to form an interlocking engagement with an accessory of the power tool.

In some embodiments, the work surface includes markings that facilitate workpiece placement and measurement.

In some embodiments, the markings comprise depressions in the work surface.

In some embodiments, the storage case includes at least one insert disposed inside the storage case, the at least one insert having a contoured surface that is configured to receive and support a hand held power tool and at least one accessory.

In some aspects, a storage case includes a first case half pivotably joined to a second case half via a case rotational joint. In addition, the storage case includes a worktable configured to be stowed inside the storage case. The worktable has a panel that is supported on the first case half, and a rail device that is supported on the panel and is configured to slidably support a power tool relative to the storage case.

In some embodiments, the rail device is fixedly mounted on the outer surface of the panel. In addition, the rail device includes a rail that is spaced apart from the outer surface of the panel and extends in a direction parallel to a rotational axis of the case rotatable joint.

In some embodiments, the panel includes a folding rotational joint that permits the panel to fold so that a first part of the panel overlies a second part of the panel.

In some embodiments, the panel is foldable about the folding rotatable joint between a first panel configuration in which the first part and the second part are coplanar and disposed side-by-side and a second panel configuration in which the first part and the second part are stacked along an axis that is perpendicular to an axis of rotation of the folding rotatable joint. When the panel is in the second panel configuration, the rail device is disposed in the first case half between the panel and an inner surface of the first case half.

In some embodiments, the panel is rotatably joined to the first case half via a panel rotational joint.

In summary, the storage case may be utilized for storage and transport in one configuration and may be used as a cutting surface and guide in another configuration. The tool, charger, extra batteries, and accessories may be stored inside of the case when not in use. The work surface is revealed by unfolding panels stowed within the storage case so that the panels are coplanar and form a worktable. The guide device includes a set of rails that are fixed to one of the panels. The rails hold the power tool in a predetermined orientation relative to the work surface as it cuts the work piece.

DETAILED DESCRIPTION

Figure 5:
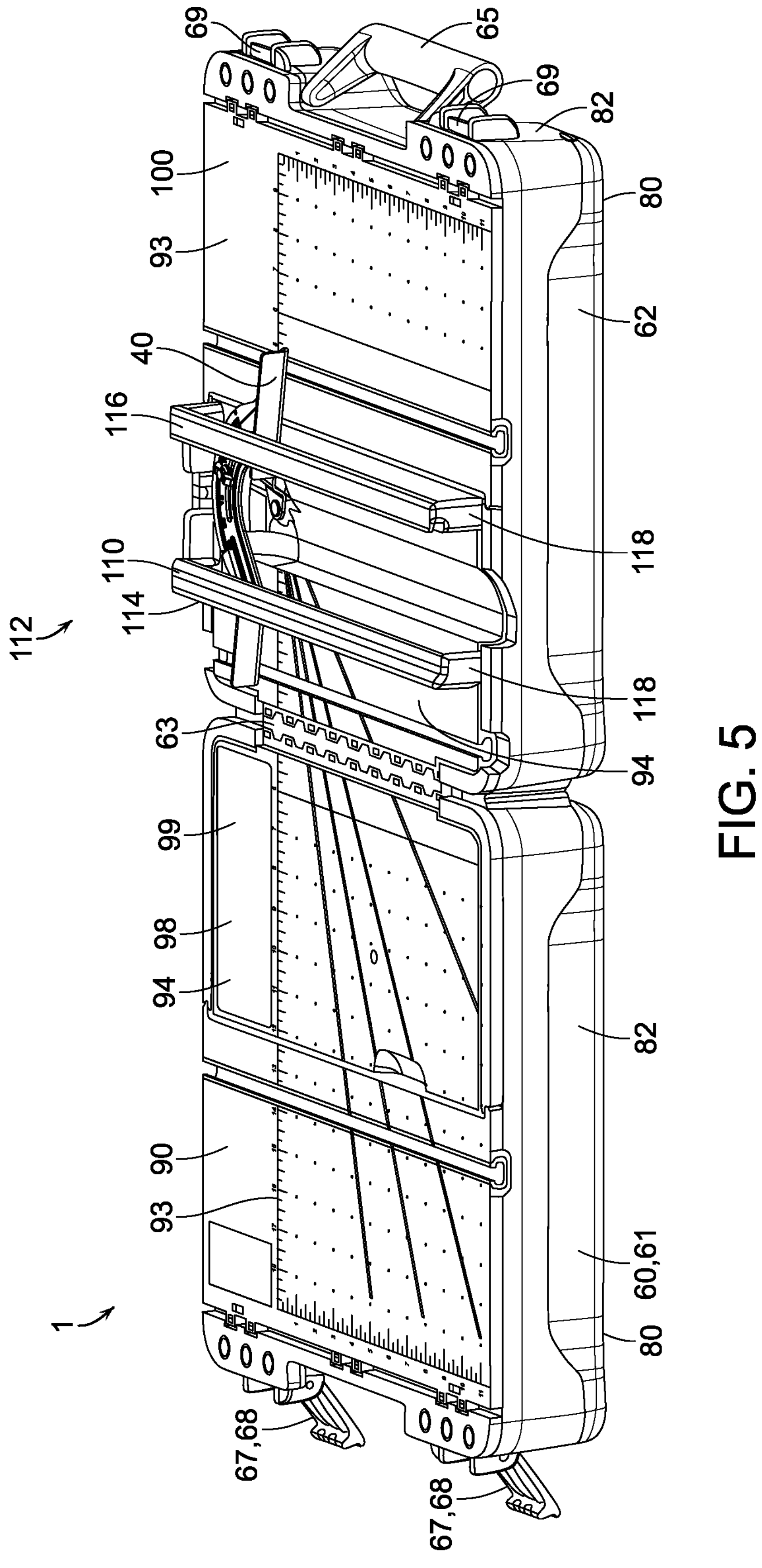
FIG. 5 is another perspective view of the kit illustrating the storage case in an open case configuration with the worktable shown in an unfolded and flat configuration, and with the power tool removed from the storage case and omitted from view, illustrating the rail device fixed to the work surface of the worktable.
Figure 6:
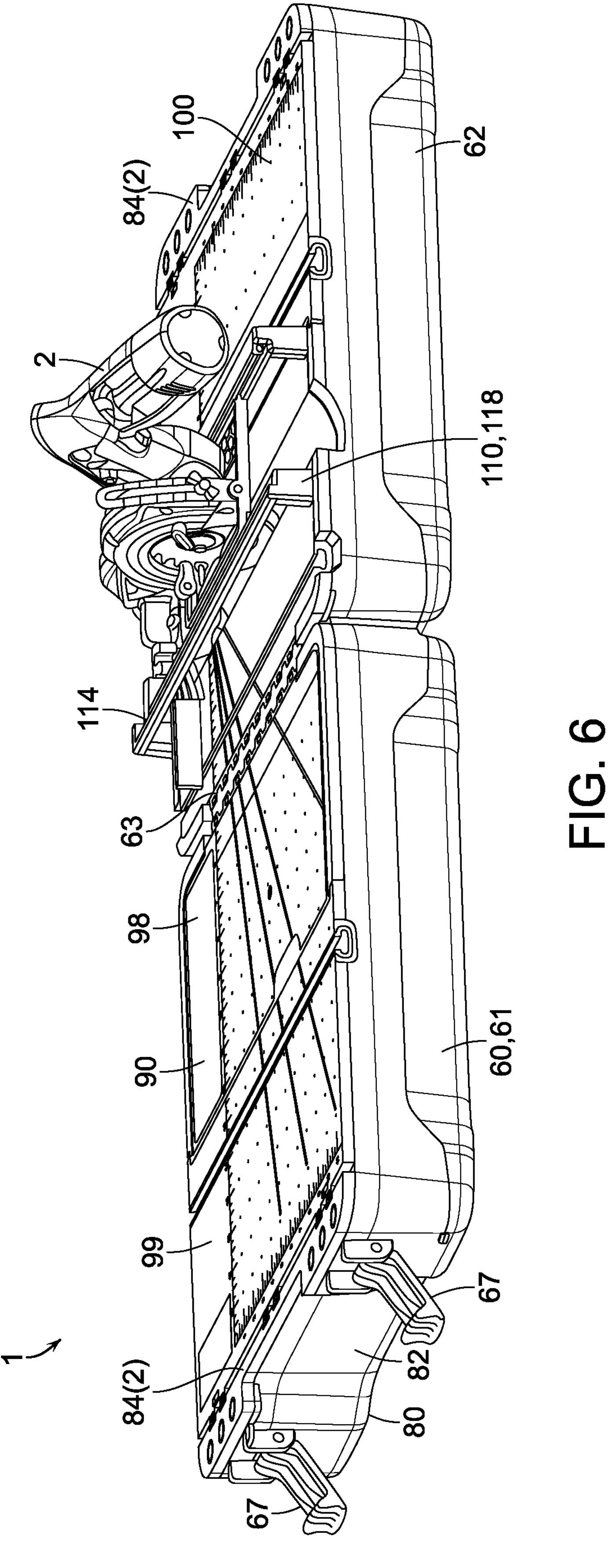
FIG. 6 is another perspective view of the kit illustrating the storage case in an open case configuration with the worktable shown in an unfolded and flat configuration, and with the power tool shown mounted on the rail device.
Figure 7:
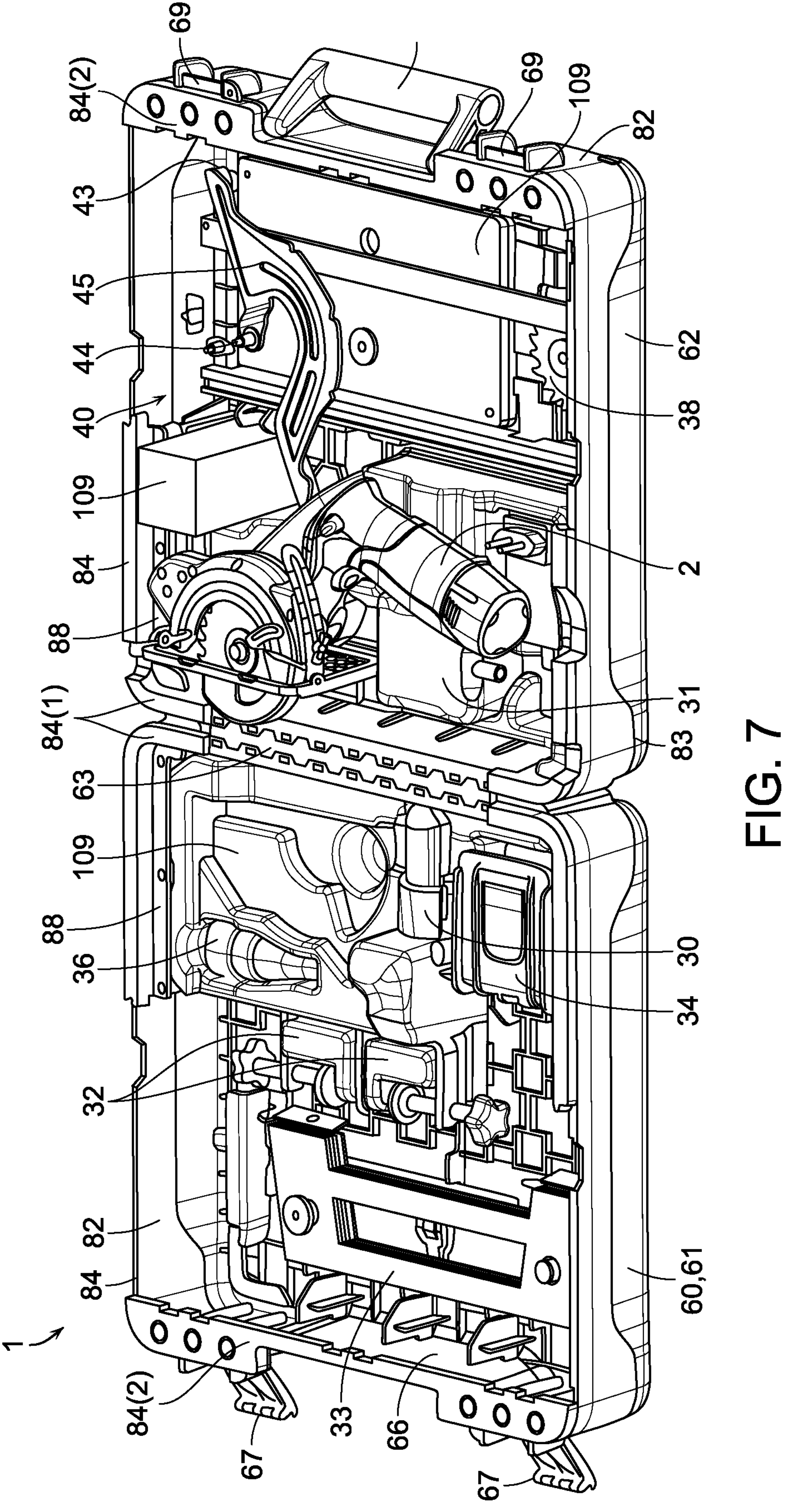
FIG. 7 is another perspective view of the kit illustrating the storage case in an open case configuration with the worktable omitted to show the power tool and ancillary devices in a stowed arrangement.

Referring to FIGS. 1-7, an exemplary embodiment of a system or kit 1 for storing and/or transporting a hand-held power tool 2 and supporting the power tool 2 during operation is described herein. The kit 1 may include a storage case 60 and the hand-held power tool 2. In the exemplary embodiment, the hand-held power tool 2 is a saw having a circular blade but is not limited to being a saw or saw having a circular blade. In addition, the kit 1 includes a foldable worktable 98 that provides a work surface 99, and a power tool-supporting guide device 110 that is fixed to the work surface 99. The storage case 60 has two case halves 61, 62 that are rotatably connected to relatively move in a clam shell manner. The storage case 60 may be arranged in a closed case configuration (FIG. 1) used to stow and protect the power tool 2 and ancillary devices during storage and/or transportation of the kit 1. In the closed case configuration, the open ends of the case halves 61, 62 abut. The interior space defined between the case halves 61, 62 receives and supports the folded worktable 98 including the guide device 110, the power tool 2 and the ancillary devices. The storage case 60 may also be arranged in an open case configuration in which the case halves 61, 62 are arranged side-by-side (FIGS. 2-6). In the open case configuration, the worktable 98 may be partially unfolded (FIG. 4) to expose and provide access to the items stored in the storage case 60, including the power tool 2, the guide device 110 and the ancillary devices. The ancillary devices are accessories and attachments that may be used to facilitate operation of the power tool 2. In this exemplary embodiment, the kit 1 includes several ancillary devices, including but not limited to, one or more cutting blades 38, a power tool battery 30, a battery charger 31 for charging the battery 30, a dust hose adaptor 36, a miter guide 40, clamps 32 and work supports 33, 34 (FIG. 7). In the open case configuration, the worktable 98 may be fully unfolded (FIGS. 5 and 6). The outward-facing surface of the worktable 98 provides a work surface 99 that supports a workpiece (not shown) during a cutting operation by the power tool 2. Details of the power tool 2 and storage case 60 are provided below.

Figure 8:
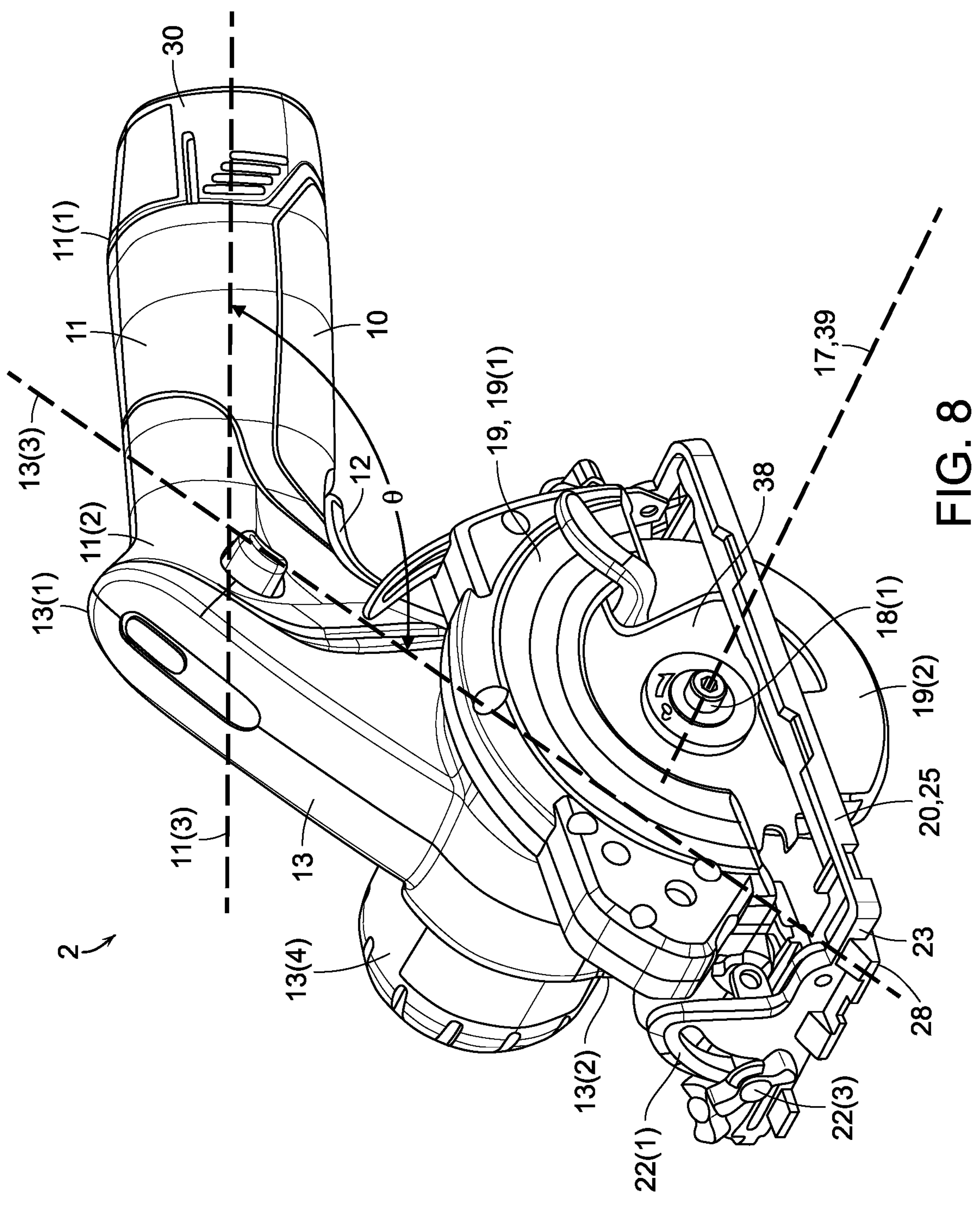
FIG. 8 is a perspective view of the power tool.

Referring to FIG. 8, the power tool 2 may be a hand-held saw that employs a circular blade 38 for cutting. In other embodiments, the power tool 2 may be a different type of saw, a different type of rotary tool, a non-rotary power tool such as an oscillating tool or sander, or a non-powered (e.g., manual) hand tool. The power tool 2 includes a generally gun-shaped tool housing 10 that is detachably connectable to a power source such as the battery pack 30. In particular, the tool housing 10 includes an elongated handgrip portion 11 and a body portion 13. The handgrip portion 11 includes a handgrip proximal end 11(1) that includes a connector for electrical connection to the battery pack 30, and a distal end 11(2) that is opposite the proximal end 11(1). The handgrip includes a handgrip axis 11(3) that extends through the handgrip proximal and distal ends 11(1), 11(2). The body portion 13 extends from the handgrip distal end 11(2). A trigger 12 that protrudes from the handgrip portion 11 at a location near the body portion 13. The trigger 12 may be used to control the cutting blade 38 rotational speed.

The tool housing body portion 13 includes a proximal end 13(1) that is integral with the handgrip distal end 11(2), a distal end 13(2) that is opposite the body portion proximal end 13(1) and a body portion axis 13(3) that extends through the body portion proximal and distal ends 13(1), 13(2). The body portion axis 13(3) is angled relative to the handgrip axis 11(3), for example, the angle Θ between the handgrip axis 11(3) and the body axis 13(3) may be in a range of 90 degrees to 140 degrees. The body portion axis 13(3) and the handgrip axis 11(3) reside in a plane P that is parallel to the plane defined by the mounted cutting blade 38.

Figure 9:
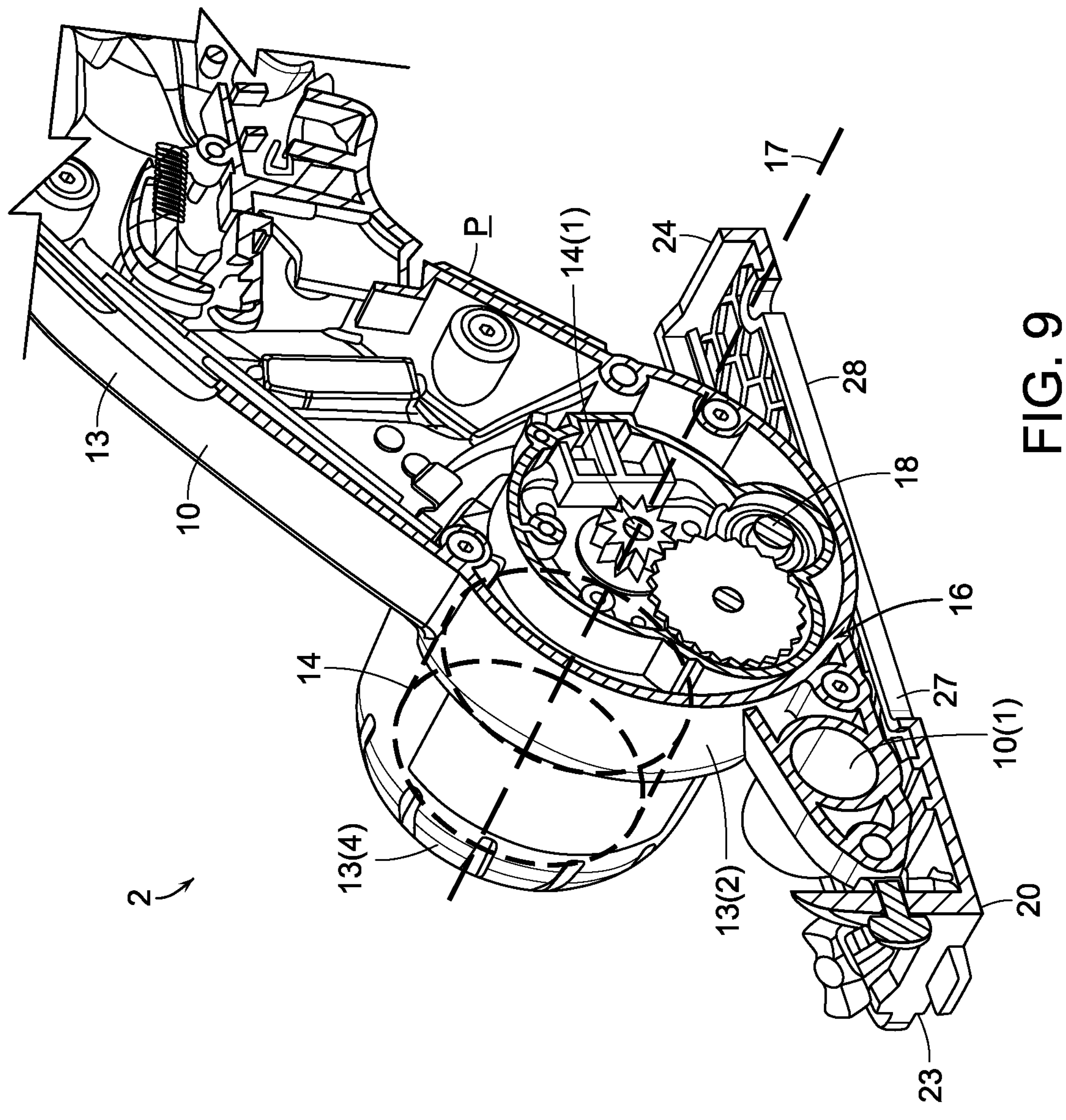
FIG. 9 is a perspective cross-sectional view of a portion of the power tool of FIG. 8.
Figure 10:
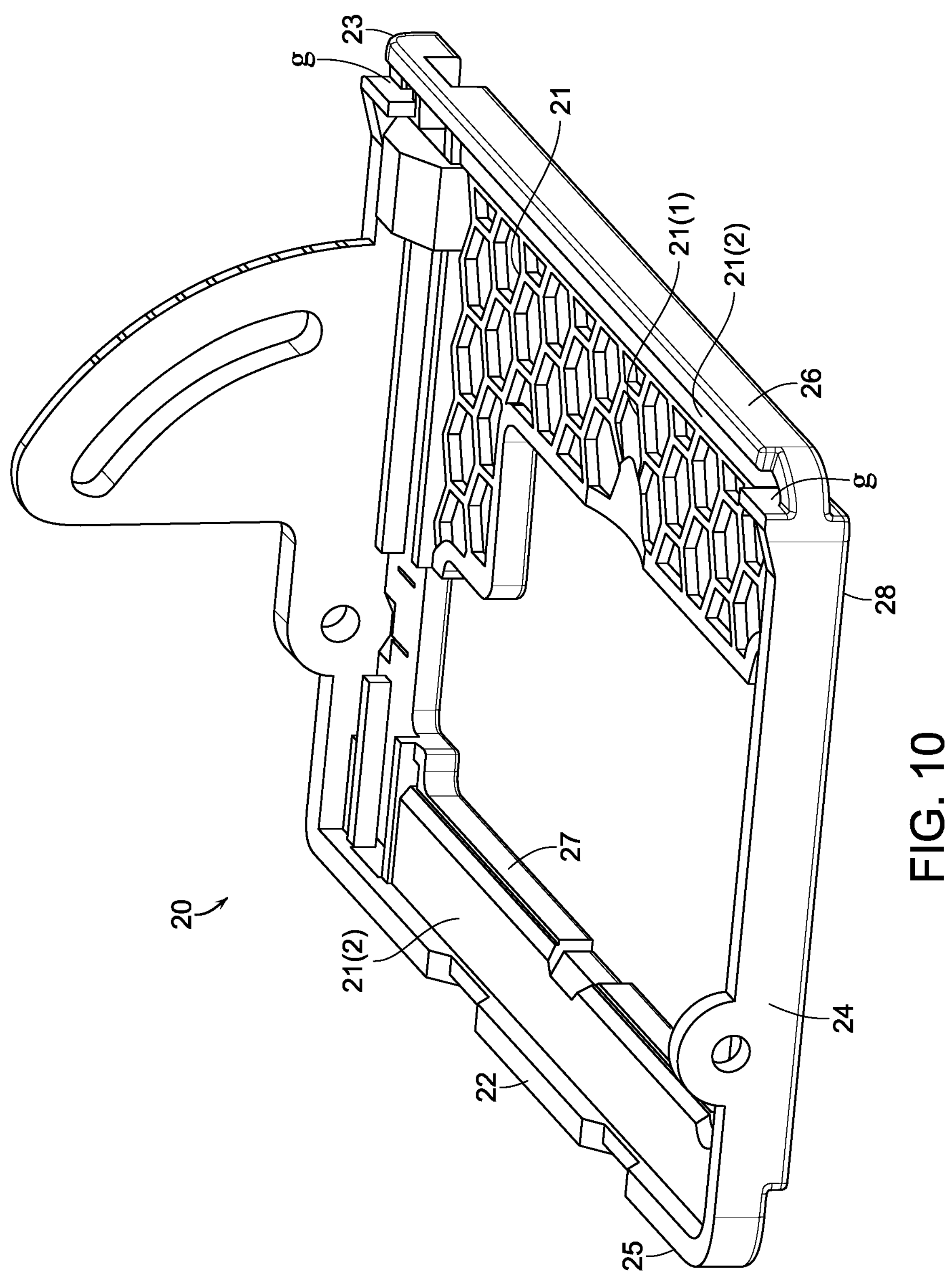
FIG. 10 is a perspective view of a foot plate of the power tool of FIG. 8.
Figure 11:
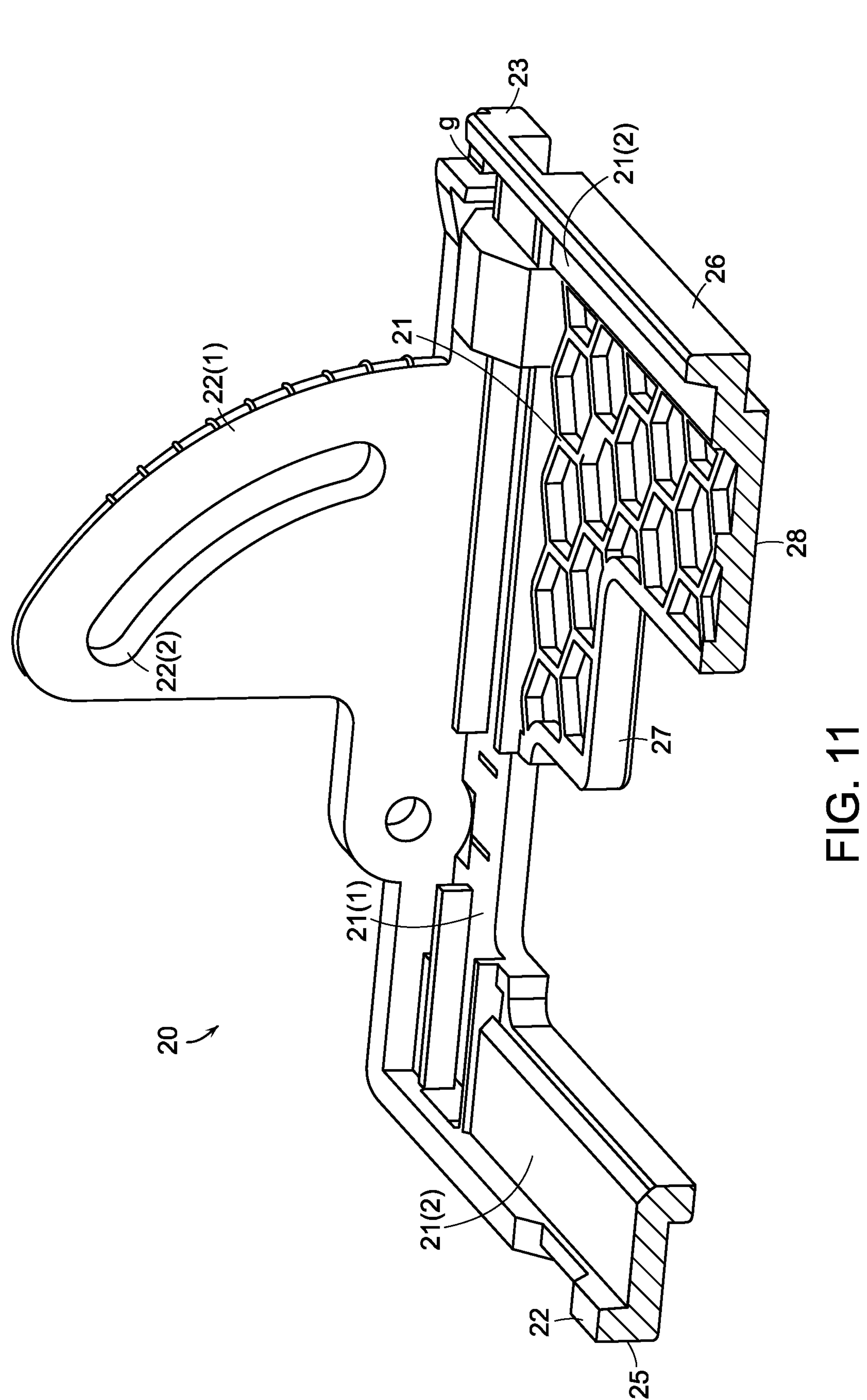
FIG. 11 is a cross-sectional view of the foot plate of FIG. 10.

Referring to FIG. 9, which shows a cross-sectional view of the power tool 2 at the plane P, the power tool 2 includes a brushless electric motor 14 that is disposed in an enlarged portion 13(4) of the power tool housing 10 that is provided at the body portion distal end 13(2). The motor 14 is arranged so that the rotational axis 17 of the motor output shaft 14(1) extends in a direction that is perpendicular to the plane P in which the handgrip axis 11(3) and the body axis 13(3) reside. The motor output shaft 14(1) is connected to an output spindle 18 via a speed-reducing gear set 16 in such a way that the motor 14 and the output spindle 18 are disposed on opposed sides of the plane P. The output spindle 18 is parallel to, and offset relative to, the motor output shaft 14(1). The output spindle 18 has a terminal end 18(1) that protrudes from the tool housing 10 and mechanically connects to the cutting blade 38. The output spindle 18 drives the cutting blade 38 to rotate relative to the tool housing 10.

Referring to FIGS. 8-11, the power tool 2 includes a rigid footplate 20 that is connected to the body portion distal end 13(2). The footplate 20 has a stepped plate body 21 that has a generally rectangular profile when the power tool 2 is viewed in top plan view. The body 21 includes a planar central portion 21(1) and platform portions 21(2) that extend along opposed sides of the central portion 21(1) and are offset toward the tool housing 10 relative to the central portion 21(1). The footplate 20 includes an upstanding rim 22 that extends along the periphery of the body 21, which includes a leading end 23, a trailing end 24 that is parallel to and opposite the leading end 23, a first lateral side 25 and a second lateral side 26 that is parallel to and opposite the first lateral side 25. The first and second lateral sides 25, 26 are longer than the leading and trailing ends 23, 24. The first and second lateral sides 25, 26 extend in parallel to the plane P that includes the handgrip and body axes 11(3), 13(3). The first lateral side 25 includes one of the platform portions 21(2), and the second lateral side 26 includes the other platform portion 21(2). The rim 22 extends continuously about the body periphery except at the intersections of the second lateral side 26 with the leading and trailing ends 23, 24 where gaps g exist. The gaps g permit insertion of the footplate 20 into the guide device 110 that is described below.

The central portion 21(1) of the body 21 includes an irregular polygonally-shaped through opening 27 that is shaped and dimensioned to receive the cutting blade 38 and portions of a blade guard 19 therethrough. The through opening 27 is spaced apart from, and surrounded by, the rim 22 and adjoins the platform portion 21(2) along the first lateral side 25. In addition, the central portion 21(1) of the body 21 includes a planar outer surface 28 that abuts the workpiece when the power tool 2 is in use and stabilizes the power tool 2 with respect to the workpiece.

The platform portions 21(2) extend along, and include, a respective one of the first and second lateral sides 25, 26. When the power tool 2 is used with the guide device 110, the platform portions 21(2) are supported on the rails 114, 116 of the guide device 110. At least one of the platform portions 21(2) is shaped to interlock with the rail on which it is supported. In the illustrated embodiment, the first lateral side 114 and the corresponding platform portion 21(2) rests on an upper surface of the first rail 114, while the second lateral side 25 and the corresponding platform portion 21(2) are configured to interlock with an L-shaped groove 117 that is provided in the second rail 116.

Along the leading end 23, the rim 22 includes an upstanding protrusion 22(1) that permits the power tool to cut at an adjustable bevel angle. The protrusion 22(1) has a curved slot 22(2) that receives a threaded fastener 22(3) therethrough. The fastener 22(3) can detachably engage the tool housing 10 and has a manipulatable knob that permits the user to select the cut bevel angle.

In addition to orienting the power tool 2 relative to the workpiece and permitting the adjustment of the cut bevel angle, the footplate 20 also permits adjustment of the cut depth.

The tool housing also includes a blade guard 19. The blade guard 19 includes a fixed portion 19(1) that is fixed to the tool housing 10 and overlies the footplate 20 and encloses an upper portion of the cutting blade 38. References to direction such as upper, lower, above, below, etcetera, are made herein with respect to the upright orientation shown in FIG. 8. It is understood that the power tool 2 is not limited to being oriented and/or operated in the upright orientation shown in FIG. 8, and references to direction are relative, nonlimiting, and used for purposes of description only. The blade guard 19 includes a movable portion 19(2) that is rotates relative to the tool housing 10 about the cutting blade rotational axis 39. The blade guard movable portion 19(2) encloses a lower portion of the cutting blade 38 and is driven to rotate by the workpiece during a cutting operation of the power tool 2.

The power tool 2 may also include attachments, for example one of the ancillary devices such as a dust hose adaptor 36 used to direct cutting debris from the cutting blade and direct it, for example, from a tool housing duct 10(1) to a dust handling system (not shown) or to a dust collection bag (not shown).

Referring again to FIGS. 2-7, the storage case 60 is configured to enable storage and/or transport the power tool 2 and one or more ancillary devices and is also configured to support the power tool 2 during a cutting operation. The storage case 60 is a clam-shell-type container that includes the two case halves 61, 62 that are rotatably connected to each other.

The first case half 61 and the second case half 62 each include a rectangular base 80 and a sidewall 82 that surrounds a periphery 81 of the base 80 and is perpendicular to the base 80. The sidewall 82 has a fixed end 83 that is integral with the periphery of the base 80 and a free end 84 opposite the fixed end 83. Thus, each case half 61, 62 is a rectangular container having an open end corresponding to the sidewall free end 84 and a closed end corresponding to the base 80. The second case 62 half is rotatably connected to the first case half 61 along a first portion 84(1) of the free end 84 via a first or "case" rotatable joint 63. For example, the first rotatable joint 63 may be a single, elongate rotatable joint that extends along the length of the first portion 84(1) such as a piano hinge. Alternatively, the first rotatable joint 63 may consist of a plurality of relatively smaller individual, rotatable joints such as a butt hinge, a pivot hinge, a living hinge, a ball joint, etcetera. The relatively smaller individual, rotatable joints may be spaced apart along the first portion 84(1) of the free end 84.

The first case half 61 rotates about the first rotatable joint 63 relative to the second case half 62 between the closed case configuration (FIG. 1) and the open case configuration (FIGS. 2-6).

In the closed case configuration, the sidewall 82 of the first case half 61 is aligned with the sidewall 82 of the second case half 62 and the free ends 84 of the first and second case halves 61, 62 face each other. In some embodiments, the free ends 84 of the first and second case halves 61, 62 abut or otherwise engage with each other. The interior space 66 defined between the case halves 61, 62 receives and supports the folded worktable 98 including the guide device 110 the power tool 2 and the ancillary devices.

In the illustrated embodiment, the storage case 60 includes a handle 65 that is pivotably connected to the sidewall 82 of the second case half 62 at a location that is closely adjacent to or adjoining a second portion 84(2) of the free end 84. The free end second portion 84(2) is parallel to the free end first portion 84(1). The handle 65 may be gripped by the user during transport of the closed storage case 60.

In the illustrated embodiment, the storage case 60 includes a pair of latches 67 that are configured to maintain the storage case in a closed configuration and permit the storage case to be selectively opened. The latches 67 are connected to the sidewall 82 of the case halves 62 at a location that is closely adjacent to or adjoining the second portion 84(2) of the free end 84. In particular, the latches 67 are spaced apart along the sidewall 82 with the handle 65 disposed between the latches 67 of the pair. Each latch 67 comprises a hook element 68 and a bar element 69 that is detachably engageable by the hook element 68. In the illustrated embodiment, the hook elements 68 of the pair of latches 67 are disposed closely adjacent to the free end second portion 84(2) of the first case half 61, while the bar elements 69 of the pair of latches 67 are disposed closely adjacent to the free end second portion 84(2) of the second case half 62.

Figure 1:
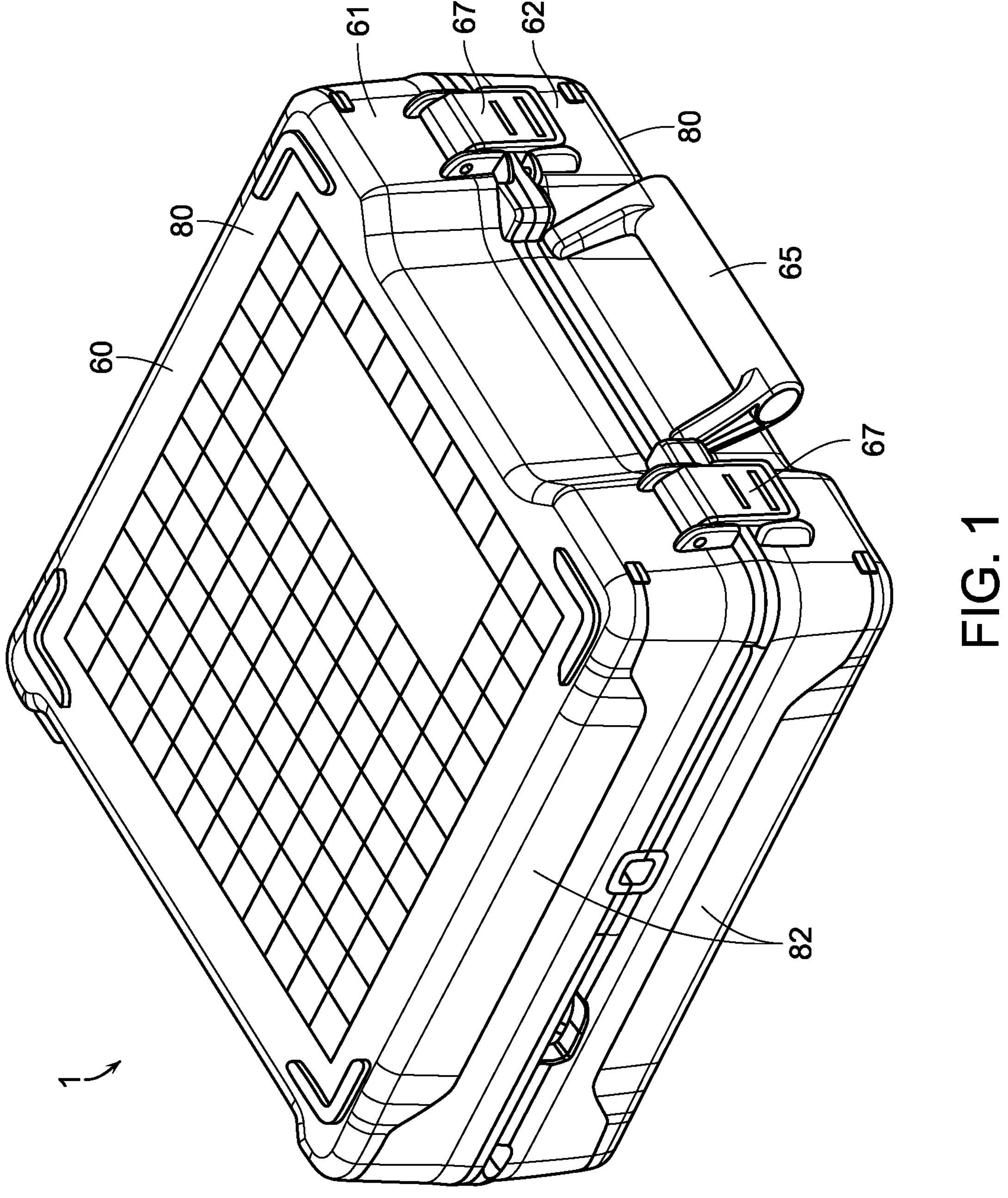
FIG. 1 is a perspective view of the kit illustrating the storage case in a closed case configuration with the worktable, the power tool and the ancillary devices stowed inside the storage case.
Figure 2:
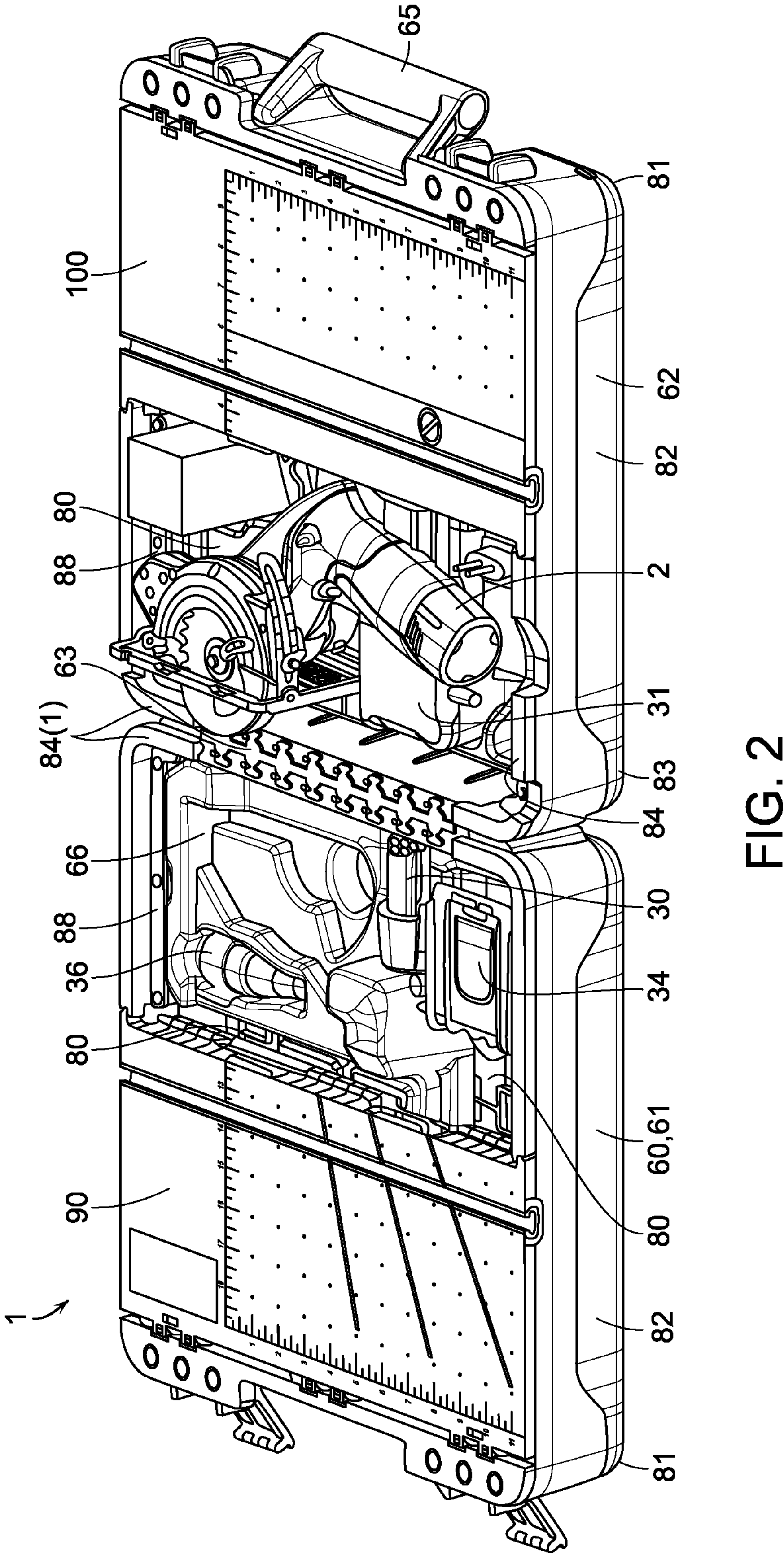
FIG. 2 is a perspective view of the kit illustrating the storage case in an open case configuration with the worktable shown in a folded and stowed configuration, and with the power tool and the ancillary devices stowed inside the storage case.
Figure 3:
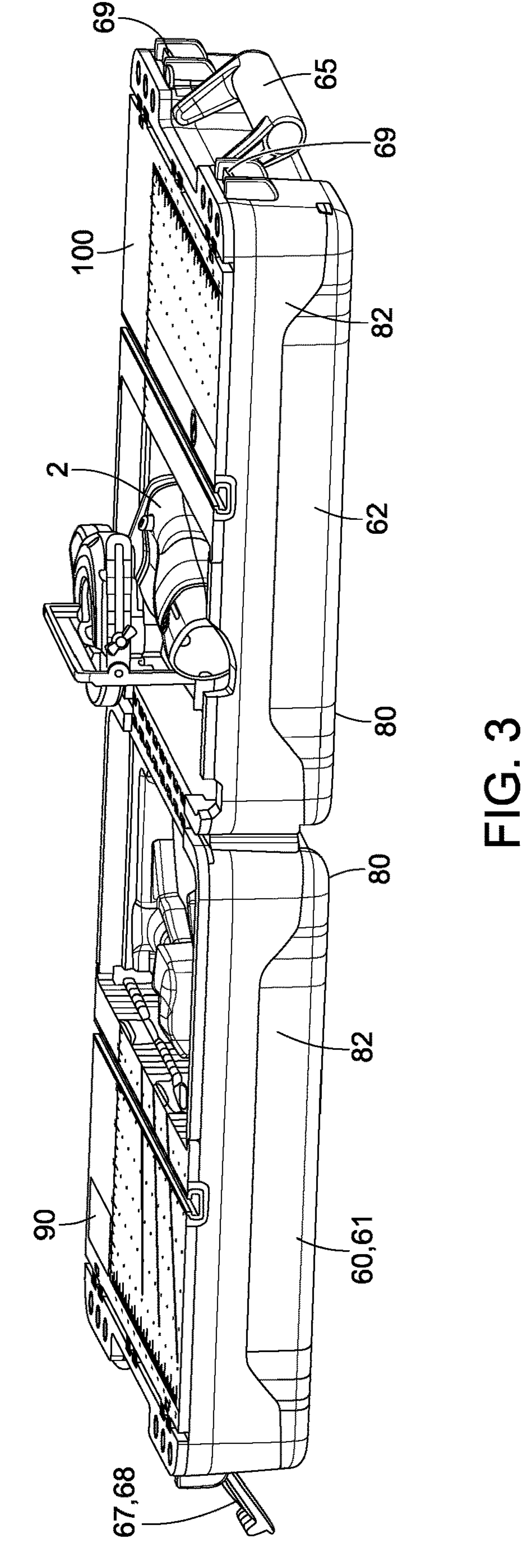
FIG. 3 is another perspective view of the kit illustrating the storage case in an open case configuration with the worktable shown in a folded and stowed configuration, and with the power tool and the ancillary devices stowed therein, illustrating that the depth of the power tool is greater than a depth of a case half.
Figure 4:
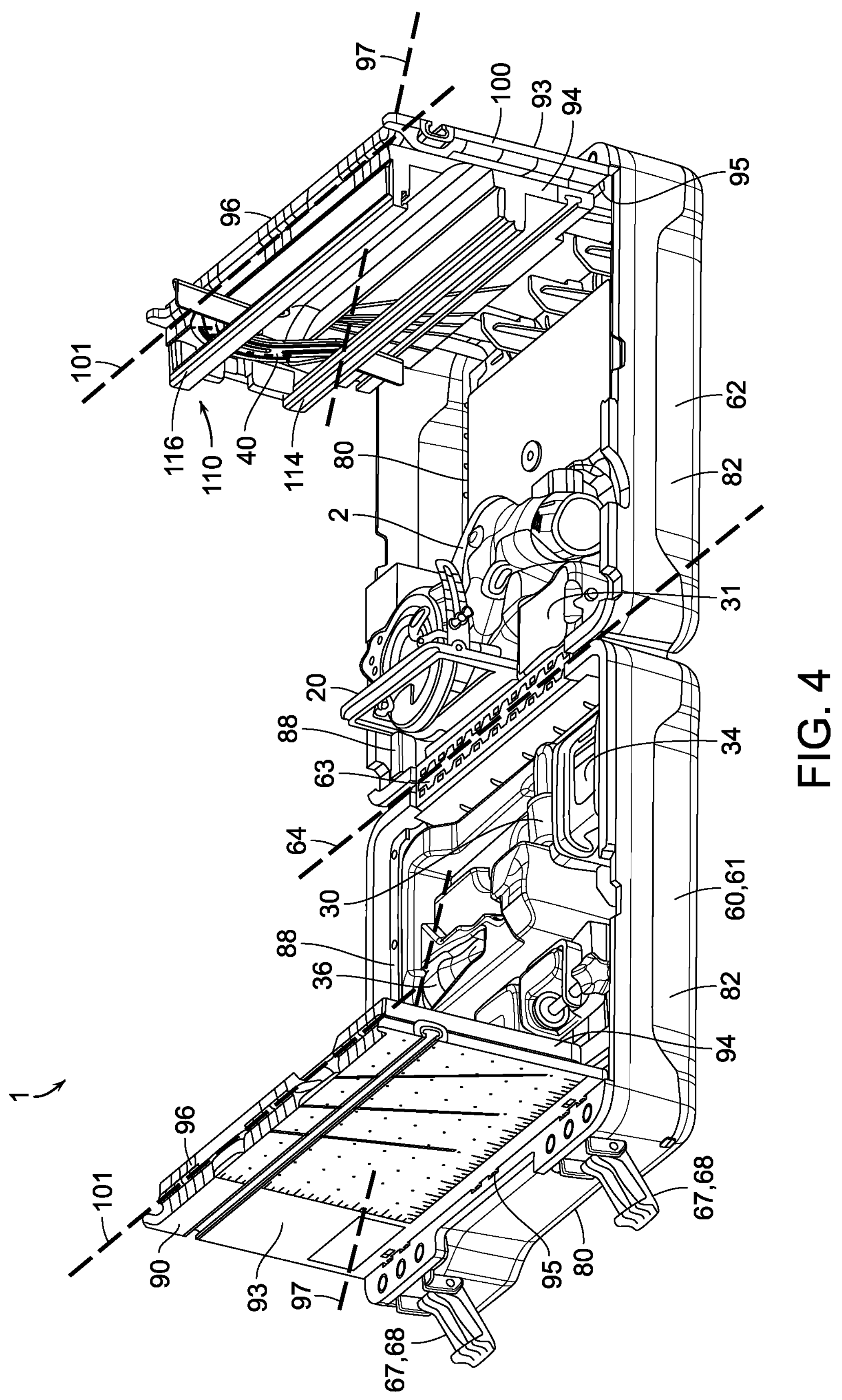
FIG. 4 is another perspective view of the kit illustrating the storage case in an open case configuration with the worktable shown in a folded and upright configuration, and with the power tool and the ancillary devices stowed inside the storage case.

In the open case configuration, the first and second case halves 61, 62 are arranged side-by-side (FIGS. 2-6) such that the base 80 of the first case half 61 is coplanar with the base 80 of the second case half 62. In this configuration, the worktable 98 may be arranged in a fully folded and stowed configuration in which the folded worktable 98 partially overlies the devices stowed inside the storage case 60 (FIG. 2).

Referring also to FIGS. 12-17, the worktable 98 includes a foldable first panel 90 and a foldable second panel 100 that, when unfolded, cooperate to provide a single, planar work surface 99. Each of the first and second panels 90, 100 include a first edge 91 and a second edge 92 that is parallel to, and spaced apart from, the first edge 91. In the first panel 90, the first edge 91 is rotatably connected to the second portion 84(2) of the free end 84 of the sidewall 82 of the first case half 61. In the second panel 100, the first edge 91 is rotatably connected to the second portion 84(2) of the free end 84 of the sidewall 82 of the second case half 62.

In the illustrated embodiment, the first edge 91 of each of the first and second panels 90, 100 are joined to opposed portions of the sidewalls 82 via respective second or "panel" rotatable joints 95. More specifically, the first edge 91 of the first panel 90 is rotatably connected to the second portion 84(2) of the sidewall free end 84 of the first case half 61 via a second rotatable joint 95. Similarly, the first edge 91 of the second panel 100 is rotatably connected to the second portion 84(2) of the sidewall free end 84 of the second case half 62 by another second rotatable joint 95. Thus, the first panel 90 and the second panel 100 are each rotatable relative to the respective case half 61, 62 to which it is joined.

In the illustrated embodiment, each second rotatable joint 95 consists of multiple, spaced apart, individual pivot hinges 95(1). Alternatively, the hinges that comprise the second rotatable joint 95 may consist of multiple individual rotatable joints such as a butt hinges or living hinges or may consist of a single elongated rotatable joint such as a piano hinge.

Each of the first panel 90 and the second panel 100 are foldable about third or "folding" rotational joints 96 that permit the respective panel 90, 100 to fold so that a first part 93 of the respective panel 90, 100 overlies a second part 94 of the respective panel 90, 100 (FIGS. 2-4 and 13-17).

More specifically, the first panel 90 includes a third rotational joint 96 that extends in parallel to the second rotational joint 95 of the first panel 90. The first part 93 of the first panel 90 includes the first edge 91, the second part 94 of the first panel 90 includes the second edge 92, and the third rotational joint 96 of the first panel 90 is disposed between the first and second edges 91, 92 of the first panel 90.

Similarly, the second panel 100 includes another third rotational joint 96 that extends in parallel to the second rotational joint 95 of the second panel 100. The first part 93 of the second panel 100 includes the first edge 91, the second part 94 of the second panel 100 includes the second edge 92, and the third rotational joint 96 of the second panel 100 is disposed between the first and second edges 91, 92 of the second panel 100.

In the illustrated embodiment, in each of the first and second panel 90, 100, the third rotational joint 96 is disposed slightly closer to the second edge 92 than the first edge 91. By this configuration, the surface area of the panel second part 94 is smaller than the surface area of the panel first part 93.

Each of the first panel 90 and the second panel 100 are foldable about the third rotatable joint 96 between a first panel configuration in which the first part 93 and the second part 94 are coplanar and disposed side-by-side (FIGS. 5-6 and 12) and a second panel configuration in which the first part 93 and the second part 94 are stacked along a stacking axis 97 that is perpendicular to an axis of rotation 101 of the respective third rotatable joint 96 (FIGS. 2-4 and 13-17).

In the illustrated embodiment, each third rotatable joint 96 consists of multiple, spaced apart, individual pivot hinges. Alternatively, the hinges that comprise the third rotatable joint 96 may consist of multiple individual rotatable joints such as a butt hinges or living hinges or may consist of a single elongated rotatable joint such as a piano hinge.

In the open case configuration, the worktable 98 may be partially unfolded (FIG. 4) by rotation of the first and second panels 90, 100 about the respective second rotatable joints 95 to expose, and provide access to, the items stored in the storage case 60, including the power tool 2, the the guide device 110 and the ancillary devices. In this context, "partially unfolded" refers to a rotation of the folded panel 90, 100 relative to the respective case half 61 or 62 to an upright orientation (e.g., to an orientation that is generally parallel to the portion of the sidewall 82 to which it is attached) so that an interior space of the case half 61 or 62 can be viewed in an unobstructed manner. In the partially unfolded state, each of the first and second panels 90, 100 remain in the second panel configuration in which the first part 93 and the second part 94 are stacked along a stacking axis 97 that is perpendicular to an axis of rotation 101 of the respective third rotatable joint 96.

Figure 12:
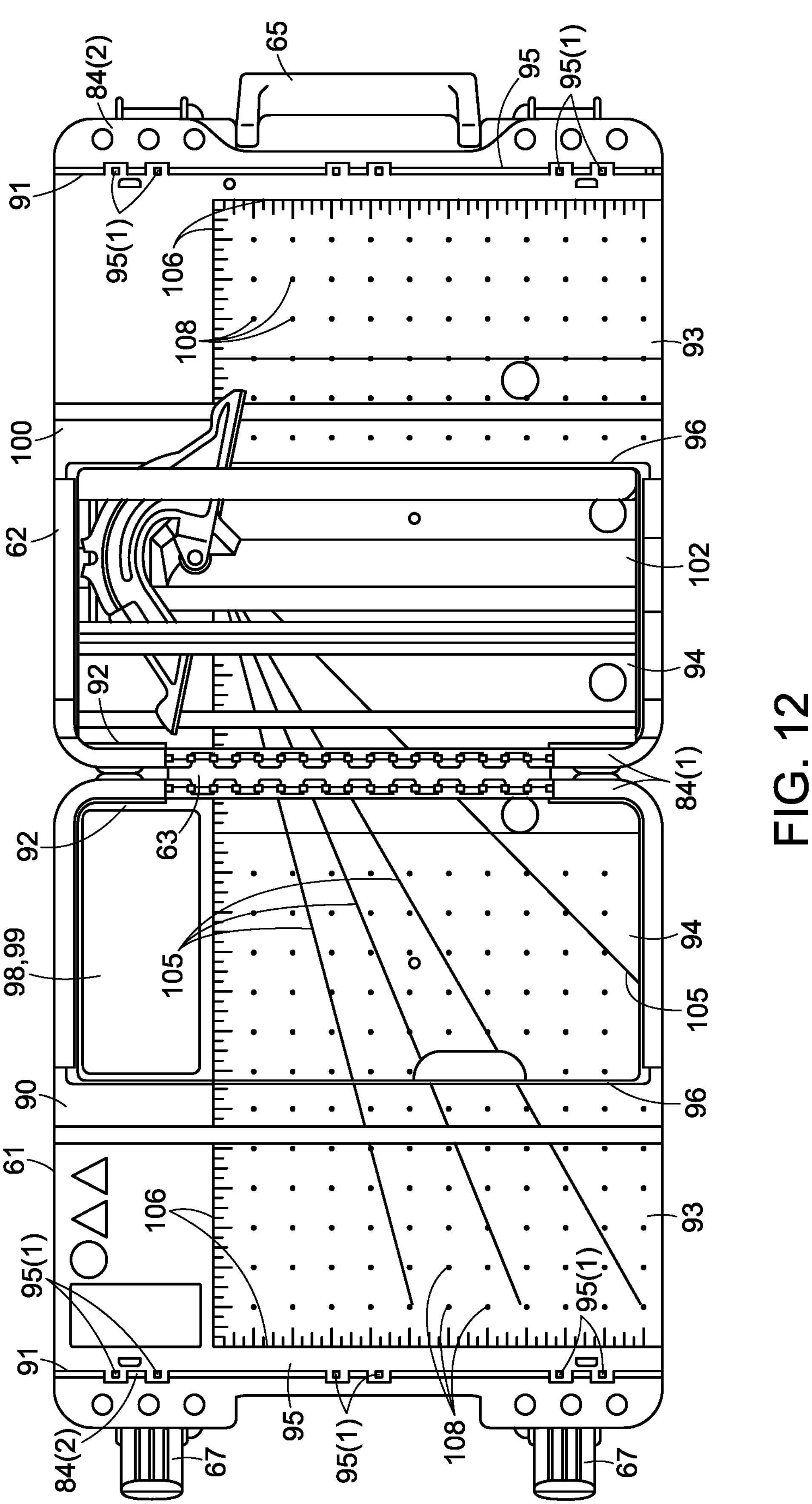
FIG. 12 is a top plan view of the kit illustrating the storage case in an open case configuration with the worktable shown in an unfolded and flat configuration, and with the power tool removed from the storage case and omitted from view.
Figure 13:
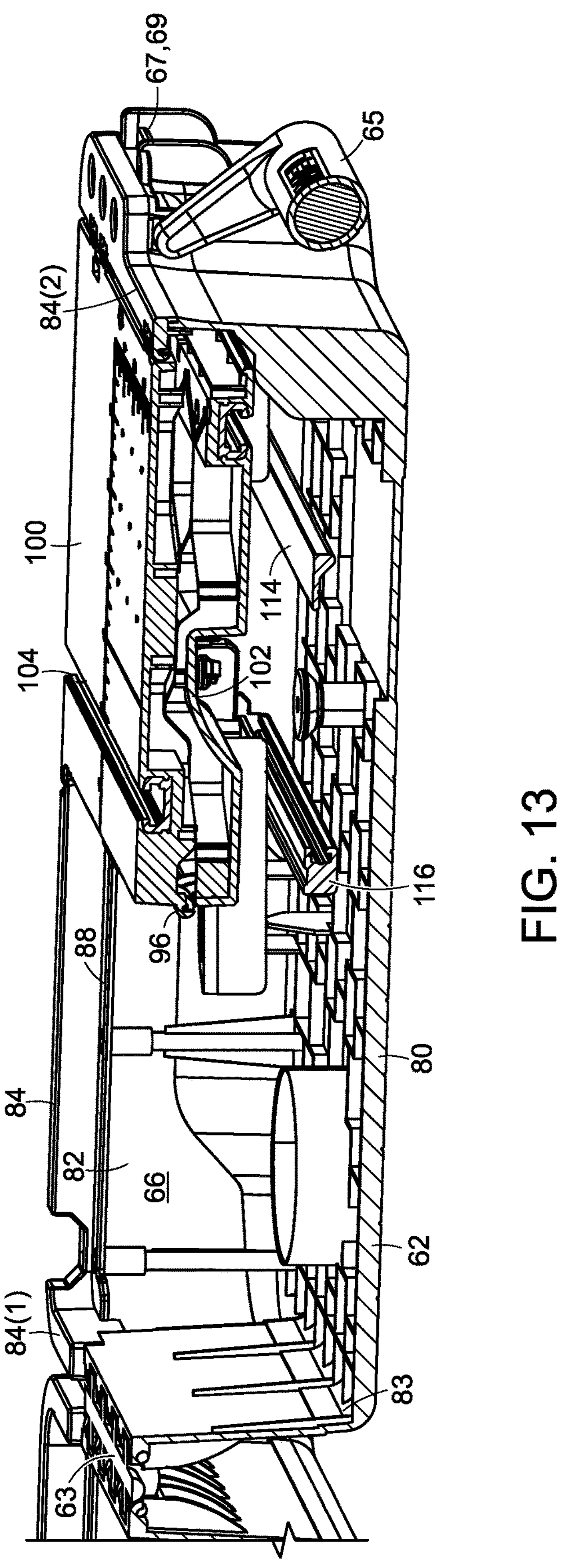
FIG. 13 is a side cross-sectional view of the kit illustrating a portion of the storage case in an open case configuration with the worktable shown in a folded and stowed configuration, and with the power tool and the ancillary devices omitted from view.
Figure 14:
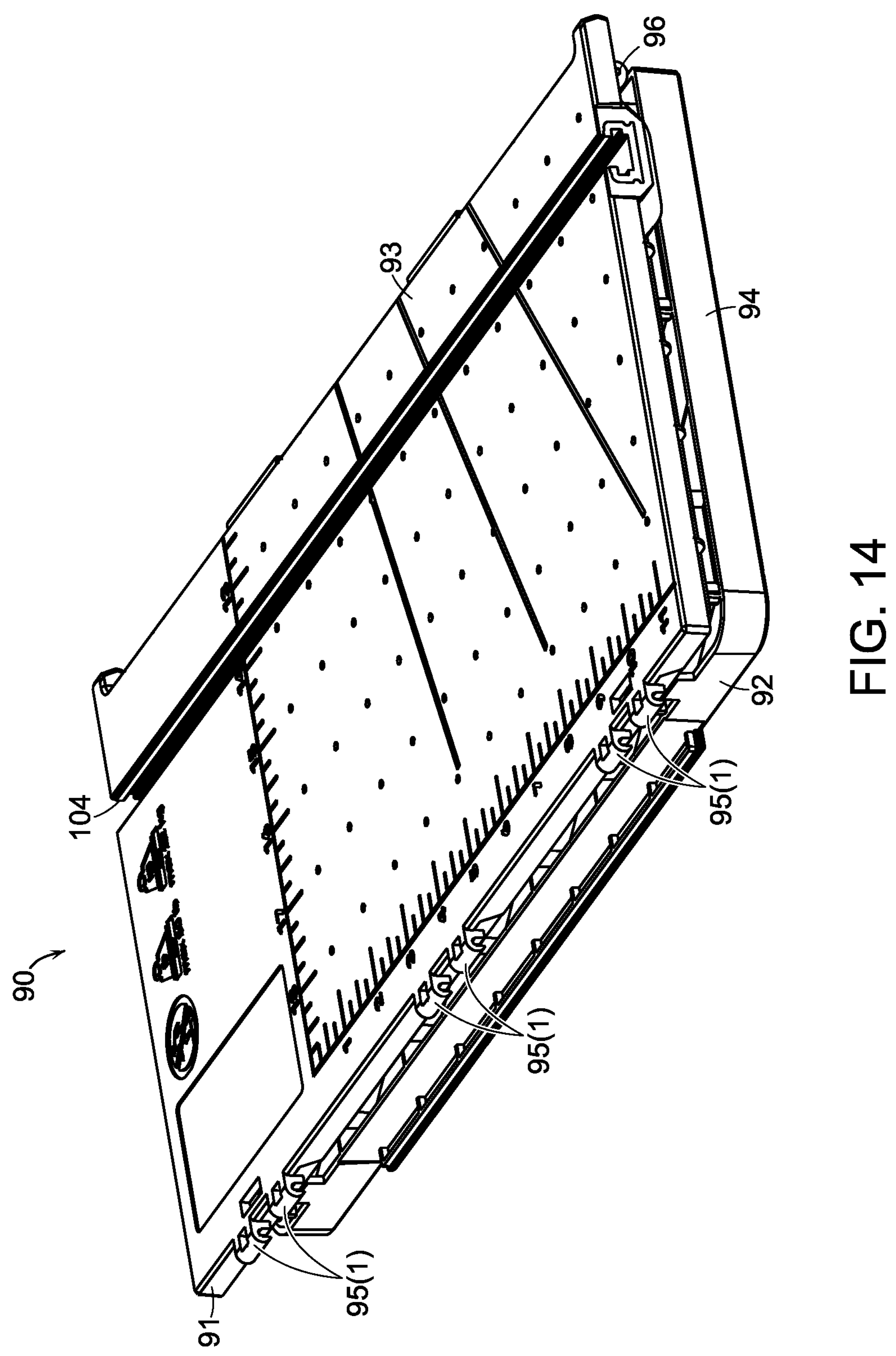
FIG. 14 is a top perspective view of the first panel of the worktable shown in the second panel configuration in which the first part of the first panel and the second part of the first panel are folded about the third rotational joint into a stacked arrangement.
Figure 15:
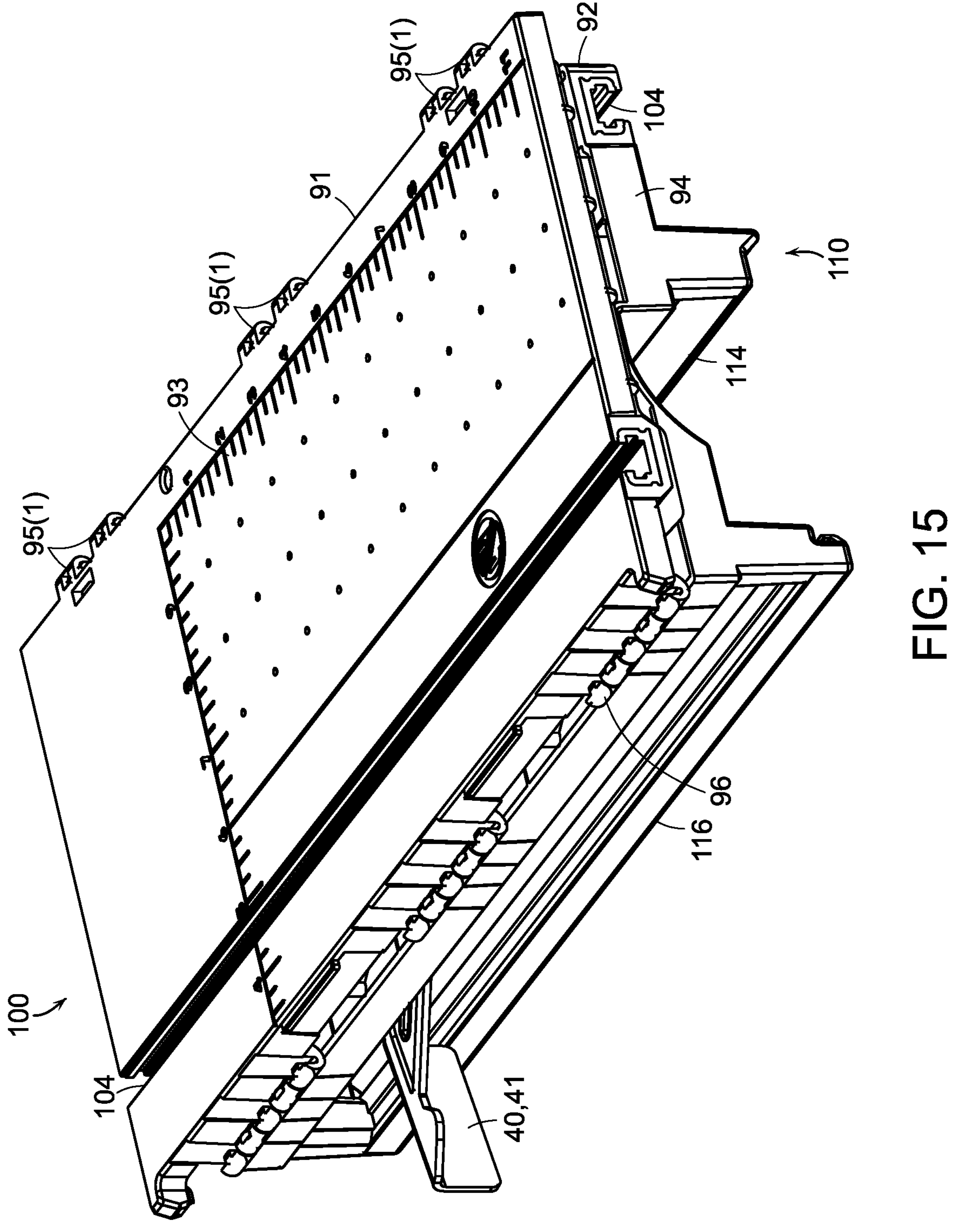
FIG. 15 is a top perspective view of the second panel of the worktable shown in the second panel configuration in which the first part of the second panel and the second part of the second panel are folded about the third rotational joint into a stacked arrangement.
Figure 16:
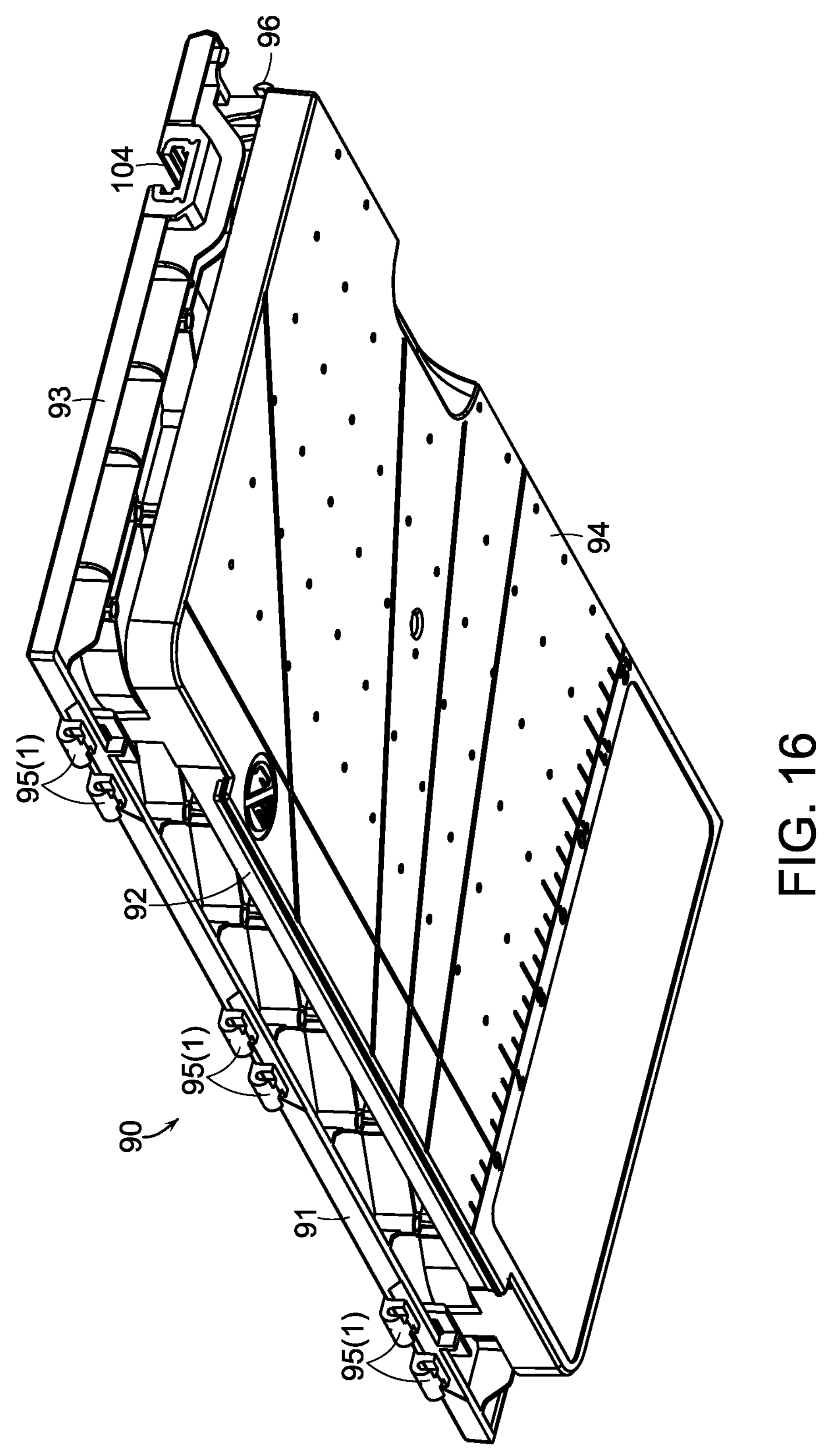
FIG. 16 is a bottom perspective view of the first panel of the worktable shown in the second panel configuration in which the first part of the first panel and the second part of the first panel are folded about the third rotational joint into a stacked arrangement.

The worktable 98 may be fully unfolded and laid flat in the open case configuration so that the first and second parts 93, 94 of the first panel 90 and the first and second parts 93, 94 of the second panel 100 are coplanar (FIGS. 5-6 and 12). In this configuration, the first panel 90 of the worktable 98 is supported on the first case half 61 and the second panel 100 of the worktable 98 is supported on the second case half 62. To this end, the inner surface of the sidewall 82 of each case half 61, 62 includes an inwardly protruding rail 88 (FIGS. 2, 4, 7 and 13). The rail 88 is disposed adjacent to, but spaced apart from, the sidewall free end 84 and extends along portions of the sidewall 82 that are perpendicular to the axis of rotation 101 of the third rotational joint 96. By this configuration, the rail 88 supports the second part 94 of each of the first and second panels 90, 100 relative to the respective case half 61, 62 when the worktable 98 is fully unfolded and laid flat.

In the open case, fully unfolded configuration, the first panel 90 and the second panel 100 provide the worktable 98. In this configuration, each of the first and second panels 90, 100 include an inner surface that faces the base 80 of the respective case half 61, 62 and an outer surface that is opposite the inner surface. The outer surfaces of the first and second panels 90, 100 serve as the outer surface of the worktable 98 and thus provide the work surface 99.

Referring to FIGS. 5-6 and 14-15, the worktable 98 includes the guide device 110 that is configured to support and/or guide a movement of the hand-held power tool 2 by the user during tool operation, in particular relative to the workpiece. In cooperation with the work surface 99, the guide device 110 is also configured to support the workpiece during the cutting operation.

The guide device 110 is secured to the worktable 98. In particular, the guide device is fixed to the work surface 99 of the second part 94 of the second panel 100, whereby the guide device 110 is mounted on the worktable 98 between the first and third rotational joints 63, 96.

The guide device 110 includes a pair of rails 112 that are fixed to the work surface 99. In some embodiments, the guide device 110 may be formed integrally with the work surface 99. The rails 114, 116 of the pair of rails 112 are parallel to each other and to a folding axis of the storage case 60 (e.g., parallel to the rotational axis 64 of the first rotatable joint 63). Each rail 114, 116 is supported at opposed ends by rail supports 118 whereby each rail 114, 116 is spaced apart from the work surface 99. As a result, the rails 114, 116 overlie the work surface 99 when the storage case 60 is in the open case configuration and the worktable 98 is fully unfolded (e.g., the panels 90, 100 of the worktable 98 are in the first panel configuration in which the first part 93 and the second part 94 are coplanar and disposed side-by-side). When the storage case 60 is in the open case configuration and the worktable 98 is folded (e.g., the panels 90, 100 of the worktable 98 are in the second panel configuration in which the first part 93 and the second part 94 are stacked) and stowed, the guide device 110 is automatically disposed within the interior space of the second case half 62 between the panel 100 and the base 80.

In use, when the storage case 60 is in the open case configuration and the worktable 98 is fully unfolded, the power tool 2 may be slidably supported on the pair of rails 112. At least one rail 116 of the pair of rails 112 is configured to engage with a portion of the power tool 2 in such a way that the power tool 2 is restricted to a sliding movement in a direction parallel to the first and second rails 114, 116. For example, in the illustrated embodiment, an upper surface 115 of the first rail 114 slidably supports the platform portion 21(2) of the foot plate first lateral side 25. In addition, the second rail 116 includes the groove 117 that receives therein the platform portion 21(2) of the footplate second lateral side 26. In particular, the portion of the rim 22 that extends along the footplate second lateral side 26 is enclosed within the groove 117 in a fit that permits sliding of the footplate 20 relative to the second rail 116. By this configuration, the second rail 116 forms an interlocking engagement with the foot plate 20 of the power tool 2.

In the illustrated embodiment, the height of the rail supports 118 (e.g., the dimension of the rail supports 118 in a direction perpendicular to the work surface 99) is less than a radius of the cutting blade 38 of the power tool 2. To accommodate the cutting blade 38 and blade guard 19 while the power tool 2 is supported on the guide device 110, the worktable 98 includes a channel 102. The channel 102 is formed in the work surface 99, extends in parallel to the pair of rails 112 and is disposed between the respective rails 114, 116 of the pair of rails 112, as best seen when the work surface is viewed in top plan view (FIG. 12). The channel 102 extends across a width of the worktable 98 and is shaped and dimensioned to receive a portion of the cutting blade 38 and the blade guard 19 in a clearance fit while the power tool 2 is supported on the rails 114, 116. In the illustrated embodiment, the channel 102 includes a first wall portion 102(1) that extends across the width of the worktable 98 and is perpendicular to the work surface 99 and a floor 102(2) of the channel 102. In addition, the channel includes a curved wall portion 102(3) that extends across the width of the worktable 98 and forms a smooth intersection with the channel floor 102(2) and an angled intersection with the work surface 99.

The worktable 98 may include one or more grooves 104 formed in the work surface 99 that are shallow relative to the channel 102. The grooves 104 extend in parallel to the pair of rails 112 and extends across a width of the worktable 98. Each groove 104 has a T-shaped cross-section that is configured to permit an interlocking engagement with ancillary devices such as clamps 32, work piece supports 33, etcetera. In the illustrated embodiment, the worktable 98 includes three grooves 104: A groove 104 is provided in the second panel 100 on each side of the guide device 110, and a groove 104 is provided on the first panel 90 between the second and third rotational joints 95, 96.

As best seen in FIG. 12, the work surface 99 may include markings that facilitate workpiece placement and measurement. For example, in the illustrated embodiment, the work surface 99 includes angle guide markings 105, rule guide markings 106 and grid markings 108. The angle guide markings 105 are shallow grooves that originate at one end of the guide device 110 and extend outward across the work surface 99 at prescribed, commonly used angles. The rule guide markings 106 are also shallow and represent an orthogonal set of scales. The grid markings 108 are shallow point depressions in the work surface 99 that represent a grid corresponding to the scales. Although in the illustrated embodiment, the markings 105, 106, 108 are generated by forming shallow grooves or depressions in the work surface 99, the markings are not limited to this. For example, some or all of the markings 105, 106, 108 may be printed on the work surface 99 by known techniques or provided by other methods.

Figure 17:
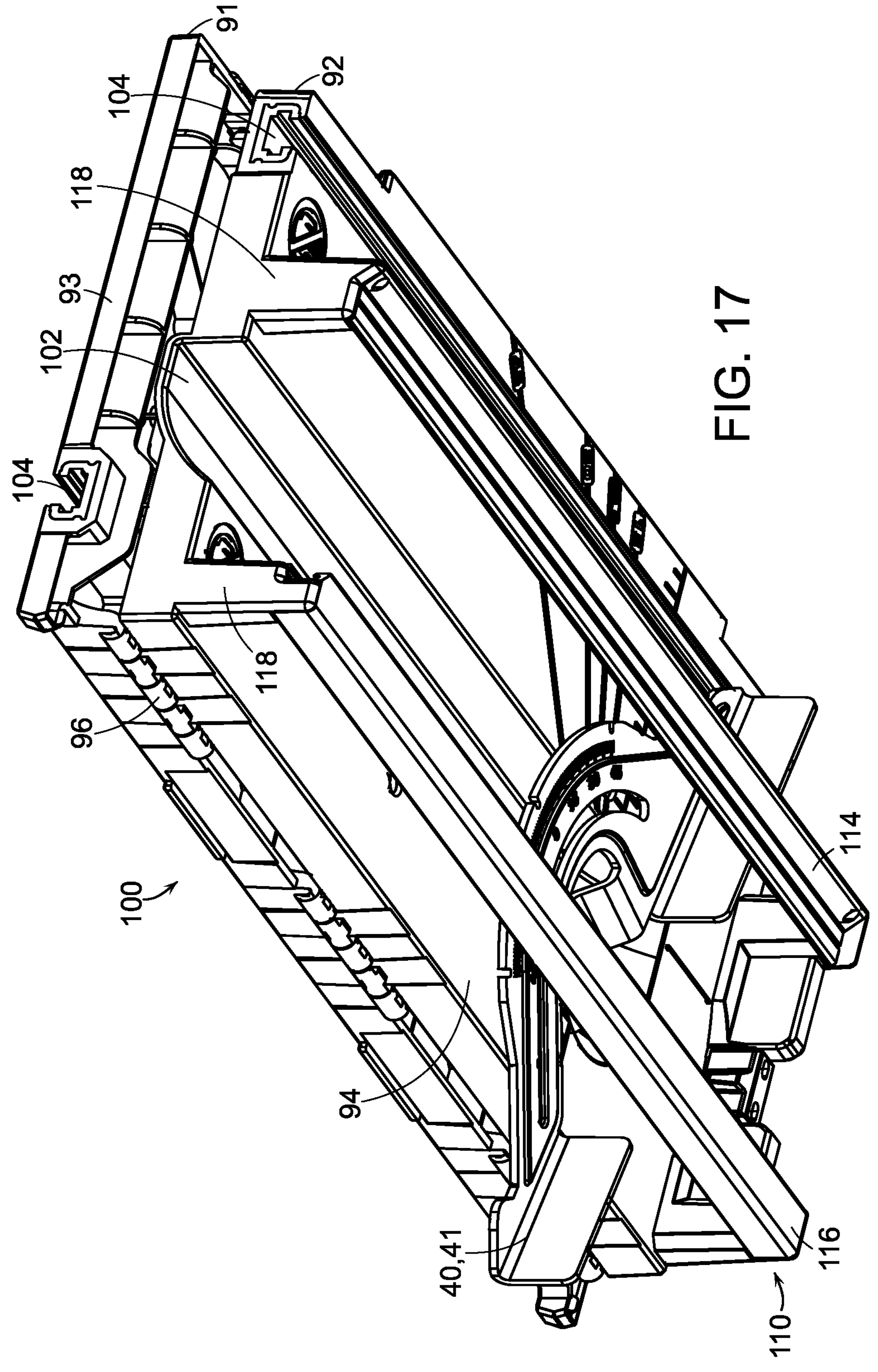
FIG. 17 is a bottom perspective view of the second panel of the worktable shown in the second panel configuration in which the first part of the second panel and the second part of the second panel are folded about the third rotational joint into a stacked arrangement.
Figure 18:
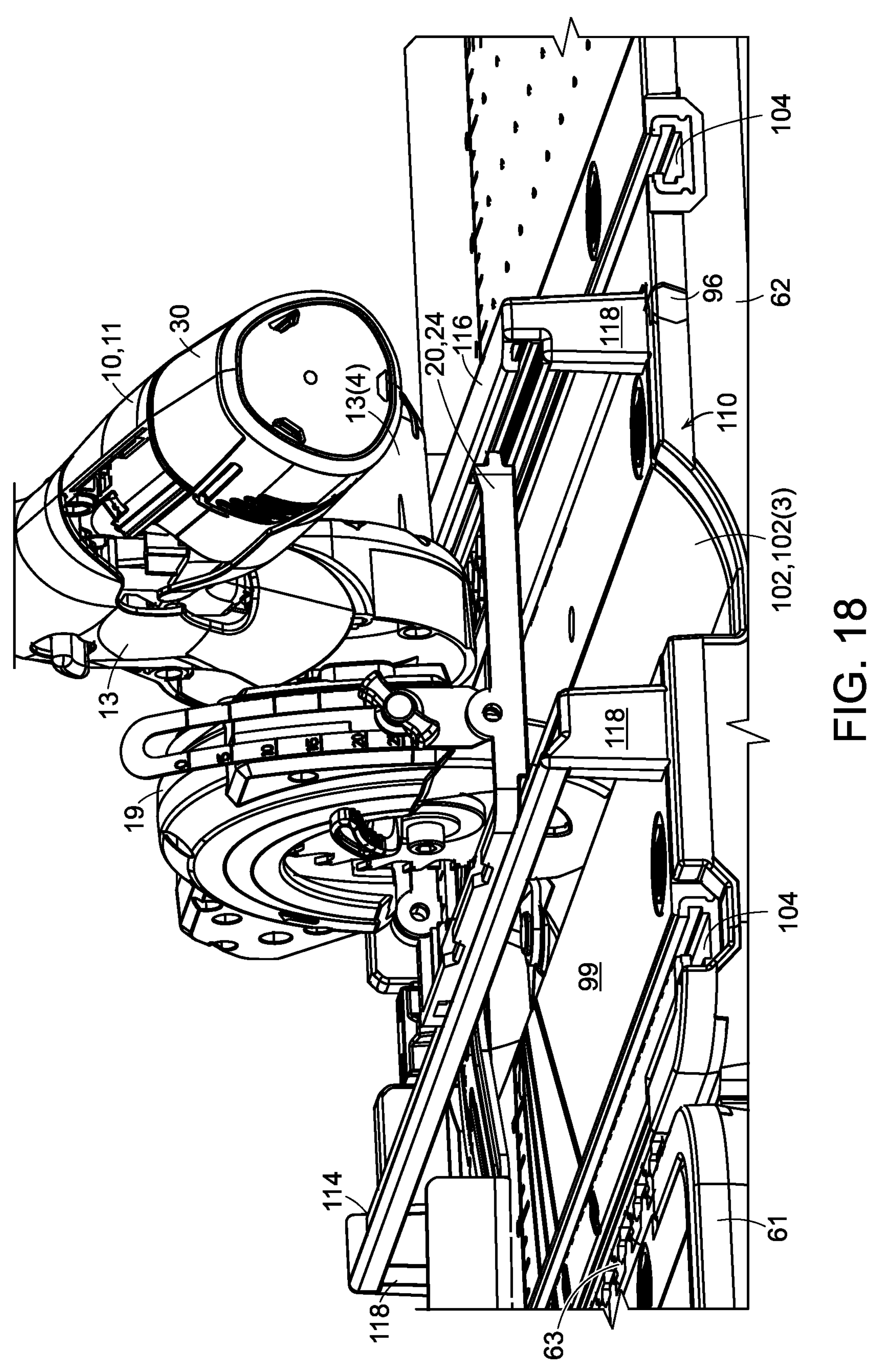
FIG. 18 is a perspective view of the kit illustrating the storage case in an open case configuration with the worktable shown in an unfolded and flat configuration and showing the power tool supported on the guide device.
Figure 19:
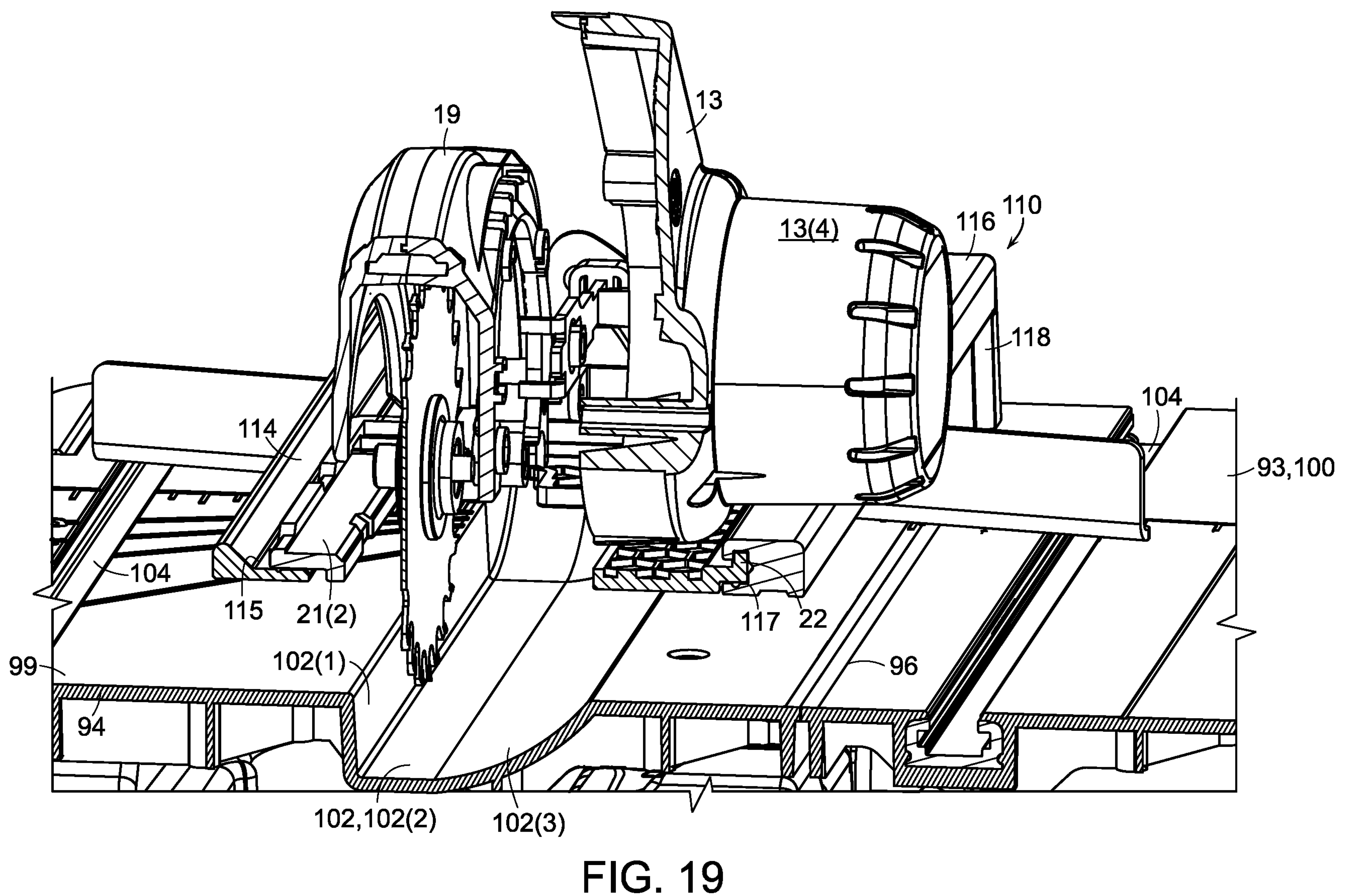
FIG. 19 is a cross sectional view of the kit illustrating the storage case in an open case configuration with the worktable shown in an unfolded and flat configuration and showing the power tool supported on the guide device.

Referring to FIGS. 5, 12 and 17, the worktable 98 includes the miter guide 40 that is configured to hold a workpiece at a set angle during a cutting operation of the power tool 2. The miter guide 40 (which may also be referred to as a "miter gauge") includes a guide body 41 that is secured to the work surface 99 via a pivot pin 44. The guide body includes an indicator portion 42 and a back plate 43 that adjoins one edge of the indicator portion 42. The back plate 43 stands upright relative to the indicator portion 42 and extends out of the channel 102 so as to overlie the work surface 99 on each side of the channel 102. In addition, the guide body 41 is configured so that the back plate 43 is perpendicular to work surface 99. In use, the guide body 41 serves as a backstop for a workpiece during a cutting operation.

The pivot pin 44 secures the indicator portion 42 to the worktable 98. The pivot pin 44 is located in the channel floor 102(2) closely adjacent to one end of the channel 102 and the indicator portion 42 generally extends between the pivot pin and the nearest sidewall 82 of the second case half 62. The indicator portion 42 has a profile that is a generally hemispherical when viewed in top plan view and includes a curved angle adjustment slot 45 that receives an angle adjustment screw (not shown) having knob shaped screw head. The indicator portion 42 includes indicia along the angle adjustment slot 45 indicating a selection of angles representing the angle of the back plate 43 relative to the rails 114, 116 of the guide device 110. When the angle adjustment screw is loosened, the indicator portion 42 may pivot about the pivot pin 44. The angle adjustment screw may be tightened, compressing the indicator portion 42 against the work surface 99, whereby the user may fix the indicator portion 42 relative to the work surface 99 with the back plate 43 at a desired angle.

The miter guide 40 may be configured to permit continuous adjustment of the angle of the guide body 41 relative to the work surface 99. Alternatively, the miter guide 40 may be configured to permit adjustment of the angle of the guide body 41 relative to the work surface 99 between separate discrete and predetermined angles.

The miter guide 40 is adjustably connected to the work surface at a location that is between the respective rails 114, 116 of the pair of rails 112 as seen when the work surface is viewed in top plan view (FIG. 12). In addition, the miter guide 40 is disposed between the pair of rails 112 and the work surface 99 when the work surface is seen in side view (FIG. 5). When the worktable 98 is folded and stowed, the miter guide 40, which is rotatably secured to the second panel 100, is automatically positioned within the interior space of the storage case 60.

The ancillary devices include accessories and attachments that may be used with the power tool 2. In the illustrated embodiment, several ancillary devices are included in the kit 1, including but not limited to, one or more cutting blades 38, a power tool battery 30, a battery charger 31 for charging the battery 30, a dust hose adaptor 36, a miter guide 40, clamps 32 and work supports 33, 34. The storage case 60 may include at least one insert 109 that is disposed inside the storage case 60 and is configured to organize and support the ancillary devices within the storage case interior space. In some embodiments, the insert 109 may include contoured forms that have depressions shaped and dimensioned to receive the power tool 2 and at least some of the ancillary devices that are stored in the storage case 60. In other embodiments, the insert 109 may be a separator such as a wall portion or block that segregates the interior space of the storage case halves 61, 62, or a combination of contoured forms and separators.

Although the storage case 60 as described herein includes foldable panels 90, 100 that are each fixed to the respective case half 61, 62 via a second (or panel) rotational joint 95, the storage case 60 is not limited to this configuration. For example, in some embodiments, the second rotational joint may be configured to permit selective detachment of the panels 90, 100 from the respective case halves 61, 62. In another example, in some embodiments, the second rotational joint may be replaced with a snap-in connection that permits detachment of the panels 90, 100 from the respective case halves 61, 62.

An exemplary embodiment of the kit including a storage case for storing and/or transporting a hand-held power tool and supporting the power tool during a cutting operation is described above in some detail. It should be understood that only structures considered necessary for clarifying the kit have been described herein. Other conventional structures, and those of ancillary and auxiliary components of the kit are assumed to be known and understood by those skilled in the art. Moreover, while a working example of the kit including the storage case and power tool has been described above, the kit is not limited to the working example described above, but various design alterations may be carried out without departing from the device as set forth in the claims.

What is claimed, is:

1. A storage case comprising:
- a first case half pivotably joined to a second case half via a case rotatable joint, and
- a worktable configured to be stowed inside the storage case,
- the worktable including a panel that is supported on the first case half, wherein the panel includes a folding rotatable joint that permits the panel to fold so that a first part of the panel overlies a second part of the panel, the panel is rotatably joined to the first case half via a panel rotatable joint, and the worktable comprises an integrated rail device that is supported on the worktable and is configured to slidably support a power tool relative to the work surface.

2. The storage case of claim 1, wherein the first case half and the second case half each include a base, and a sidewall that surrounds a periphery of the base and is perpendicular to the base, the sidewall including a fixed end that is integral with the periphery of the base and a free end opposite the fixed end, the second case half being rotatably connected to the first case half along a first portion of the free end via the case rotatable joint, wherein the panel including includes a first edge that is rotatably connected to a second portion of the free end via the panel rotatable joint, a second edge that is parallel to the first edge, the first part that includes the first edge, the second part that includes the second edge, and the folding rotatable joint that joins the first part to the second part, whereby the panel is foldable about the folding rotatable joint between a first panel configuration in which the first part and the second part are coplanar and disposed side-by-side and a second panel configuration in which the first part and the second part are stacked along an axis that is perpendicular to an axis of rotation of the folding rotatable joint, wherein the storage case may be arranged in a closed case configuration in which the free end of the first case half faces the free end of the second case half and in which the panel of the first case half and the panel of the second case half are disposed inside the storage case, and an open case configuration in which the first case half is disposed side-by-side with the second case half, and the panel of the first case half and the panel of the second case half are each in the first panel configuration and cooperate to provide a work surface.

3. The storage case of claim 2, wherein the folding rotatable joint is parallel to the first edge and the second edge.

4. The storage case of claim 2, wherein at least one of the case rotatable joint, the panel rotatable joint and the folding rotatable joint is a hinge.

5. The storage case of claim 2, wherein when the storage case is arranged in the open case configuration, the work surface is supported on both the first case half and the second case half.

6. The storage case of claim 2, wherein the panel of the first case half and the panel of the second case half each include an inner surface and an outer surface that is opposite the inner surface, the storage case includes the rail device that is mounted on the outer surface of the panel of the first case half, and the rail device is configured to support a power tool relative to the work surface.

7. The storage case of claim 6, wherein the rail device is fixedly mounted on the outer surface of the panel of the first case half at a location in which when the panel is in the second panel configuration, the rail device resides in the first case half between the panel and the base.

8. The storage case of claim 6, wherein the rail device is fixedly mounted on the outer surface of the panel of the first case half, and includes a rail that is spaced apart from the outer surface of the panel of the first case half and extends in a direction parallel to a rotational axis of the case rotatable joint.

9. The storage case of claim 2, wherein the panel of the first case half and the panel of the second case half each include an inner surface and an outer surface that is opposite the inner surface, the rail device includes a pair of rails that is mounted on the outer surface of the panel of the first case half, and the pair of rails is configured to support a power tool relative to the work surface.

10. The storage case of claim 9, wherein at least one rail of the pair of rails is configured to form an interlocking engagement with a portion of the power tool.

11. The storage case of claim 9, wherein at least one rail of the pair of rails is configured to engage with a portion of the power tool in such a way that the power tool is restricted to movement in a direction parallel to a rotational axis of the first case rotatable joint.

12. The storage case of claim 9, wherein the work surface comprises a channel that extends in parallel to the pair of rails, and the channel is disposed between the respective rails of the pair of rails as seen when the work surface is viewed in top plan view.

13. The storage case of claim 9, wherein the storage case further comprises a miter guide that is adjustably connected to the work surface at a location that is between the respective rails of the pair of rails as seen when the work surface is viewed in top plan view.

14. The storage case of claim 2, wherein the work surface includes grooves that extend in parallel to a portion of the free edge, the grooves configured to form an interlocking engagement with an accessory of the power tool.

15. The storage case of claim 2, wherein the work surface includes markings that facilitate workpiece placement and measurement.

16. The storage case of claim 15, wherein the markings comprise depressions in the work surface.

17. The storage case of claim 2, comprising at least one insert disposed inside the storage case, the at least one insert having a contoured surface that is configured to receive and support a hand held power tool and at least one accessory.

18. A storage case comprising:

a first case half pivotably joined to a second case half via a case rotatable joint, and a worktable configured to be stowed inside the storage case, the worktable including a panel that is supported on the first case half, and a rail device that is supported on the panel and is configured to slidably support a power tool relative to the storage case, wherein the panel includes a folding rotatable joint that permits the panel to fold so that a first part of the panel overlies a second part of the panel.

19. The storage case of claim 18, wherein the rail device is fixedly mounted on the outer surface of the panel, and the rail device includes a rail that is spaced apart from the outer surface of the panel and extends in a direction parallel to a rotational axis of the case rotatable joint.

20. The storage case of claim 19, wherein the panel is foldable about the folding rotatable joint between a first panel configuration in which the first part and the second part are coplanar and disposed side-by-side and a second panel configuration in which the first part and the second part are stacked along an axis that is perpendicular to an axis of rotation of the folding rotatable joint, and when the panel is in the second panel configuration, the rail device is disposed in the first case half between the panel and an inner surface of the first case half.

21. The storage case of claim 18, wherein the panel is rotatably joined to the first case half via a panel rotatable joint.

* * * * *